United States Patent
McCann et al.

(10) Patent No.: US 10,142,921 B2
(45) Date of Patent: *Nov. 27, 2018

(54) WIRELESS NETWORK SERVICE TRANSACTION PROTOCOL

(71) Applicant: BlackBerry Limited, Waterloo (CA)

(72) Inventors: Stephen McCann, Southampton (GB); Michael Peter Montemurro, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/483,759

(22) Filed: Apr. 10, 2017

(65) Prior Publication Data

US 2017/0215129 A1   Jul. 27, 2017

Related U.S. Application Data

(63) Continuation of application No. 14/854,685, filed on Sep. 15, 2015, now Pat. No. 9,622,155, which is a (Continued)

(51) Int. Cl.
*H04W 4/00* (2018.01)
*H04W 48/14* (2009.01)
(Continued)

(52) U.S. Cl.
CPC .......... *H04W 48/14* (2013.01); *G06F 21/606* (2013.01); *H04L 61/1541* (2013.01);
(Continued)

(58) Field of Classification Search
CPC .... H04W 48/08; H04W 48/14; H04L 61/1541
See application file for complete search history.

(56) References Cited

U.S. PATENT DOCUMENTS 6,493,561 B1   12/2002   Hasegawa
7,010,305 B2   3/2006    Immonen et al.
(Continued)

FOREIGN PATENT DOCUMENTS

CN   1893396 A   1/2007
CN   1969529 A   5/2007
(Continued)

OTHER PUBLICATIONS

Wi-Fi Alliance; "Wi-Fi Peer-to-Peer (P2P) Technical Specification"; Version 1.2; 2010; 159 pages.
(Continued)

*Primary Examiner* — Farah Faroul
(74) *Attorney, Agent, or Firm* — Conley Rose, P.C.; J. Robert Brown, Jr.; Gayatry S. Nair

(57) ABSTRACT

A mobile device may retrieve service information about a network prior to associating with the network. Utilizing an advertisement protocol to transmit service query messages, a mobile device may receive service query responses from a network that identify the services available prior to establishing network capability. In other words, the messaging is prior to the exchange of any authentication parameters between the device and the network as well prior to the establishment of a recognized session between the device and the network.

28 Claims, 8 Drawing Sheets

Related U.S. Application Data continuation of application No. 13/548,864, filed on Jul. 13, 2012, now Pat. No. 9,137,621.

(51) Int. Cl.

| | | |
|---|---|---|
| *H04L 29/08* | (2006.01) | |
| *H04W 48/08* | (2009.01) | |
| *H04W 48/16* | (2009.01) | |
| *H04L 29/12* | (2006.01) | |
| *H04L 29/06* | (2006.01) | |
| *G06F 21/60* | (2013.01) | |
| *H04W 4/21* | (2018.01) | |
| *H04W 4/50* | (2018.01) | |
| *H04W 84/12* | (2009.01) | |
| *H04W 12/06* | (2009.01) | |
| *H04W 48/20* | (2009.01) | |
| *H04W 88/08* | (2009.01) | |
| *H04W 4/90* | (2018.01) | |

(52) U.S. Cl.
CPC ........ *H04L 63/0823* (2013.01); *H04L 63/162* (2013.01); *H04L 67/16* (2013.01); *H04L 67/28* (2013.01); *H04L 67/2842* (2013.01); *H04W 4/21* (2018.02); *H04W 4/50* (2018.02); *H04W 48/08* (2013.01); *H04W 48/16* (2013.01); *H04W 4/90* (2018.02); *H04W 12/06* (2013.01); *H04W 48/20* (2013.01); *H04W 84/12* (2013.01); *H04W 88/08* (2013.01)

(56) References Cited

U.S. PATENT DOCUMENTS

| | | | |
|---|---|---|---|
| 7,065,645 | B2 | 6/2006 | Teicher |
| 7,151,764 | B1 | 12/2006 | Heinonen et al. |
| 7,187,691 | B2 | 3/2007 | Gavette |
| 7,277,932 | B2 | 10/2007 | Adachi et al. |
| 7,376,097 | B2 | 5/2008 | Yegin |
| 7,606,209 | B2 | 10/2009 | Watanabe |
| 7,683,773 | B1 | 3/2010 | Goodall et al. |
| 7,684,333 | B1 | 3/2010 | Dasylva et al. |
| 8,170,481 | B2 | 5/2012 | Rangarajan et al. |
| 8,274,908 | B2 | 9/2012 | Hsin et al. |
| 8,374,122 | B2 | 2/2013 | Meier et al. |
| 8,442,024 | B2 | 5/2013 | Montemurro et al. |
| 8,458,279 | B2 | 6/2013 | Montemurro et al. |
| 8,463,175 | B2 | 6/2013 | Bajko |
| 8,514,807 | B2 | 8/2013 | Kim et al. |
| 8,594,064 | B2 | 11/2013 | Kaushik et al. |
| 8,681,769 | B2 | 3/2014 | Montemurro et al. |
| 8,750,180 | B2 | 6/2014 | McCann et al. |
| 8,775,533 | B2 | 7/2014 | Hassan et al. |
| 8,792,489 | B2 | 7/2014 | Anantharam et al. |
| 8,879,455 | B1 | 11/2014 | Stephenson et al. |
| 8,897,788 | B2 | 11/2014 | Ruuska |
| 8,929,346 | B2 | 1/2015 | Montemurro et al. |
| 8,942,221 | B2 | 1/2015 | McCann et al. |
| 9,137,621 | B2 | 9/2015 | McCann et al. |
| 9,204,299 | B2 | 12/2015 | McCann et al. |
| 9,301,127 | B2 | 3/2016 | McCann et al. |
| 9,615,383 | B2 | 4/2017 | Montemurro et al. |
| 9,622,155 | B2 | 4/2017 | McCann et al. |
| 2002/0086675 | A1 | 7/2002 | Mansour |
| 2002/0141369 | A1 | 10/2002 | Perras |
| 2002/0159418 | A1 | 10/2002 | Rudnick et al. |
| 2002/0169883 | A1 | 11/2002 | Bright et al. |
| 2003/0103521 | A1 | 6/2003 | Raphaeli et al. |
| 2003/0117984 | A1 | 6/2003 | Gavette |
| 2003/0134636 | A1 | 7/2003 | Sundar et al. |
| 2003/0217168 | A1 | 11/2003 | Adachi et al. |
| 2004/0014422 | A1 | 1/2004 | Kallio |
| 2004/0090958 | A1 | 5/2004 | Park et al. |
| 2004/0199661 | A1 | 10/2004 | Murdock |
| 2005/0060319 | A1 | 3/2005 | Douglas |
| 2005/0097362 | A1 | 5/2005 | Winget et al. |
| 2005/0111419 | A1 | 5/2005 | Kwon et al. |
| 2005/0210523 | A1 | 9/2005 | Parnell et al. |
| 2005/0286456 | A1 | 12/2005 | McNew et al. |
| 2006/0067526 | A1 | 3/2006 | Faccin et al. |
| 2006/0109113 | A1 | 5/2006 | Reyes et al. |
| 2006/0114928 | A1 | 6/2006 | Utsunomiya et al. |
| 2006/0142034 | A1 | 6/2006 | Wentink et al. |
| 2006/0221901 | A1 | 10/2006 | Yaqub et al. |
| 2006/0245373 | A1 | 11/2006 | Bajic |
| 2006/0264245 | A1 | 11/2006 | Luo |
| 2007/0025297 | A1 | 2/2007 | Lee et al. |
| 2007/0041344 | A1 | 2/2007 | Yaqub et al. |
| 2007/0064655 | A1 | 3/2007 | Ruuska |
| 2007/0064660 | A1 | 3/2007 | Qi et al. |
| 2007/0086359 | A1 | 4/2007 | Yaqub |
| 2007/0110018 | A1 | 5/2007 | Delaney et al. |
| 2007/0110092 | A1 | 5/2007 | Kangude et al. |
| 2007/0124592 | A1 | 5/2007 | Oyama |
| 2007/0153732 | A1 | 7/2007 | Yao |
| 2007/0230389 | A1 | 10/2007 | Amann et al. |
| 2007/0230423 | A1 | 10/2007 | Yoshida et al. |
| 2007/0243888 | A1 | 10/2007 | Faccin |
| 2007/0297438 | A1* | 12/2007 | Meylan ............ H04W 52/0216 370/445 |
| 2008/0031212 | A1 | 2/2008 | Ogura |
| 2008/0049761 | A1 | 2/2008 | Lin et al. |
| 2008/0057992 | A1 | 3/2008 | Griffin |
| 2008/0095048 | A1 | 4/2008 | Zhong |
| 2008/0096580 | A1 | 4/2008 | Montemurro |
| 2008/0114857 | A1 | 5/2008 | Snider |
| 2008/0123607 | A1 | 5/2008 | Jokela |
| 2008/0141031 | A1 | 6/2008 | Oba et al. |
| 2008/0151796 | A1* | 6/2008 | Jokela ................. H04W 48/08 370/310 |
| 2008/0178277 | A1 | 7/2008 | Oba et al. |
| 2008/0186962 | A1 | 8/2008 | Sinha |
| 2008/0261574 | A1 | 10/2008 | Rinta-Aho et al. |
| 2008/0270534 | A1 | 10/2008 | Xia et al. |
| 2008/0298333 | A1 | 12/2008 | Seok |
| 2009/0010399 | A1* | 1/2009 | Kim .................. H04L 12/2856 379/45 |
| 2009/0031138 | A1 | 1/2009 | Nakhjiri |
| 2009/0046657 | A1* | 2/2009 | Kim .................. H04W 36/005 370/331 |
| 2009/0047922 | A1 | 2/2009 | Buckley et al. |
| 2009/0047974 | A1 | 2/2009 | Quinn |
| 2009/0067326 | A1 | 3/2009 | Perrot et al. |
| 2009/0067397 | A1 | 3/2009 | Seok |
| 2009/0156213 | A1 | 6/2009 | Spinelli et al. |
| 2009/0177759 | A1 | 7/2009 | Ogawa et al. |
| 2009/0245184 | A1* | 10/2009 | Torres .................. H04W 4/21 370/329 |
| 2009/0247111 | A1 | 10/2009 | Sennett et al. |
| 2009/0252165 | A1 | 10/2009 | Zhang et al. |
| 2009/0296688 | A1 | 12/2009 | Bakker et al. |
| 2009/0296689 | A1 | 12/2009 | Bakker et al. |
| 2009/0298458 | A1 | 12/2009 | Bakker et al. |
| 2009/0310692 | A1 | 12/2009 | Kafle et al. |
| 2009/0325566 | A1 | 12/2009 | Bell et al. |
| 2010/0118831 | A1 | 5/2010 | Chen et al. |
| 2010/0146272 | A1 | 6/2010 | Centonza et al. |
| 2010/0169953 | A1 | 7/2010 | Hofer et al. |
| 2010/0216434 | A1 | 8/2010 | Marcellino et al. |
| 2010/0255864 | A1 | 10/2010 | Alfano et al. |
| 2010/0271978 | A1 | 10/2010 | Gupta et al. |
| 2010/0275249 | A1 | 10/2010 | McCann et al. |
| 2010/0279684 | A1 | 11/2010 | Salkintzis |
| 2010/0293293 | A1 | 11/2010 | Beser |
| 2010/0325714 | A1 | 12/2010 | Iyer et al. |
| 2011/0028093 | A1 | 2/2011 | Patel et al. |
| 2011/0040969 | A1 | 2/2011 | Yao et al. |
| 2011/0047382 | A1 | 2/2011 | Wang et al. |
| 2011/0055218 | A1 | 3/2011 | Capuozzo et al. |
| 2011/0072101 | A1 | 3/2011 | Forssell et al. |
| 2011/0103232 | A1 | 5/2011 | Sood |
| 2011/0113252 | A1* | 5/2011 | Krischer ............ H04L 63/0823 713/175 |

(56) References Cited

U.S. PATENT DOCUMENTS

| | | |
|---|---|---|
| 2011/0149806 A1 | 6/2011 | Verma et al. |
| 2011/0149938 A1 | 6/2011 | Bajko |
| 2011/0154018 A1 | 6/2011 | Edstrom et al. |
| 2011/0162060 A1 | 6/2011 | Vijayakumar et al. |
| 2011/0216743 A1 | 6/2011 | Bachmann et al. |
| 2011/0188391 A1 | 8/2011 | Sella et al. |
| 2011/0274082 A1 | 11/2011 | Calhoun et al. |
| 2011/0280227 A1 | 11/2011 | McCann et al. |
| 2011/0286405 A1 | 11/2011 | Kim et al. |
| 2012/0008605 A2 | 1/2012 | Montemurro et al. |
| 2012/0017267 A1 | 1/2012 | McCann et al. |
| 2012/0054106 A1 | 3/2012 | Stephenson et al. |
| 2012/0057568 A1 | 3/2012 | Lim et al. |
| 2012/0076117 A1 | 3/2012 | Montemurro et al. |
| 2012/0076118 A1 | 3/2012 | Montemurro et al. |
| 2012/0106514 A1 | 5/2012 | Zheng et al. |
| 2012/0116886 A1 | 5/2012 | Manku |
| 2012/0134349 A1 | 5/2012 | Jung et al. |
| 2012/0165056 A1 | 6/2012 | Kim et al. |
| 2012/0182970 A1 | 7/2012 | Ding et al. |
| 2012/0239755 A1 | 9/2012 | Filgueiras et al. |
| 2012/0243524 A1* | 9/2012 | Verma .................. H04W 48/16 370/338 |
| 2012/0244902 A1 | 9/2012 | Saito et al. |
| 2012/0246468 A1 | 9/2012 | Gabor |
| 2012/0281609 A1 | 11/2012 | Kasslin et al. |
| 2012/0296986 A1 | 11/2012 | Hassan et al. |
| 2013/0012260 A1 | 1/2013 | Salkintzis et al. |
| 2013/0028245 A1 | 1/2013 | Oerton et al. |
| 2013/0034023 A1 | 2/2013 | Jung |
| 2013/0039275 A1 | 2/2013 | Patil et al. |
| 2013/0051303 A1 | 2/2013 | Huang et al. |
| 2013/0064175 A1 | 3/2013 | Pandey et al. |
| 2013/0065627 A1 | 3/2013 | Jung et al. |
| 2013/0065633 A1* | 3/2013 | Sridhara ............... H04W 48/20 455/525 |
| 2013/0066936 A1 | 3/2013 | Krishnan et al. |
| 2013/0070738 A1* | 3/2013 | McCann ............... H04W 48/14 370/338 |
| 2013/0070739 A1 | 3/2013 | McCann et al. |
| 2013/0072248 A1* | 3/2013 | Bajko .................. H04W 48/14 455/515 |
| 2013/0148643 A1* | 6/2013 | Abraham .............. H04W 8/005 370/338 |
| 2013/0166759 A1 | 6/2013 | Rajamani et al. |
| 2013/0170351 A1 | 7/2013 | Reznik et al. |
| 2013/0176897 A1 | 7/2013 | Wang et al. |
| 2013/0177002 A1 | 7/2013 | Sun et al. |
| 2013/0208582 A1 | 8/2013 | Wijnands et al. |
| 2013/0227152 A1 | 8/2013 | Lee et al. |
| 2013/0231151 A1 | 9/2013 | Kneckt et al. |
| 2013/0259034 A1 | 10/2013 | Klein et al. |
| 2013/0259038 A1 | 10/2013 | Anantharam et al. |
| 2013/0259040 A1 | 10/2013 | Anantharam et al. |
| 2013/0262850 A1 | 10/2013 | Canpolat et al. |
| 2013/0276076 A1 | 10/2013 | Gupta et al. |
| 2013/0281056 A1 | 10/2013 | Abraham et al. |
| 2013/0282793 A1 | 10/2013 | Swings et al. |
| 2013/0316705 A1* | 11/2013 | Kneckt .................. H04L 67/16 455/435.1 |
| 2013/0339478 A1 | 12/2013 | Edge et al. |
| 2014/0016612 A1 | 1/2014 | McCann et al. |
| 2014/0018037 A1 | 1/2014 | Shanmugavadivel et al. |
| 2014/0050167 A1 | 2/2014 | Smedman et al. |
| 2014/0073356 A1 | 3/2014 | Siomina et al. |
| 2014/0078935 A1 | 3/2014 | Sun |
| 2014/0086134 A1 | 3/2014 | Smadi et al. |
| 2014/0091987 A1 | 4/2014 | Lee et al. |
| 2014/0101441 A1 | 4/2014 | Edstrom et al. |
| 2014/0164763 A1 | 6/2014 | Cherian et al. |
| 2014/0242985 A1 | 8/2014 | Kneckt et al. |
| 2014/0286242 A1 | 9/2014 | McCann et al. |
| 2014/0293978 A1 | 10/2014 | Yang et al. |
| 2015/0131641 A1 | 5/2015 | Ong et al. |
| 2015/0248702 A1* | 9/2015 | Chatterton ........ G06Q 30/0261 705/14.58 |
| 2015/0373765 A1 | 12/2015 | Lee et al. |
| 2016/0080989 A1 | 3/2016 | McCann et al. |
| 2016/0173586 A1 | 6/2016 | McCann et al. |
| 2017/0318018 A1* | 11/2017 | Huang .................. H04L 63/101 |

FOREIGN PATENT DOCUMENTS

| | | |
|---|---|---|
| CN | 101141259 A | 3/2008 |
| CN | 101142788 A | 3/2008 |
| CN | 101150442 A | 3/2008 |
| CN | 101317384 A | 12/2008 |
| CN | 101379801 A | 3/2009 |
| CN | 101395949 A | 3/2009 |
| CN | 101583151 A | 11/2009 |
| CN | 101682539 A | 3/2010 |
| EP | 1919154 A1 | 5/2008 |
| EP | 1921818 A2 | 5/2008 |
| EP | 2076090 A1 | 7/2009 |
| EP | 2093967 A2 | 8/2009 |
| EP | 2445242 A1 | 4/2012 |
| JP | 2002314546 A | 10/2002 |
| JP | 2004186753 A | 7/2004 |
| JP | 2008537657 A | 9/2008 |
| JP | 2008544588 A | 12/2008 |
| TW | 200947966 A1 | 11/2009 |
| WO | 0245456 A1 | 6/2002 |
| WO | 03092218 A1 | 11/2003 |
| WO | 2007083824 A1 | 7/2007 |
| WO | 2007103055 A2 | 9/2007 |
| WO | 2007116337 A2 | 10/2007 |
| WO | 2008049213 A1 | 5/2008 |
| WO | 2008049214 A1 | 5/2008 |
| WO | 2008107306 A1 | 9/2008 |
| WO | 2009063093 A2 | 5/2009 |
| WO | 2009101861 A1 | 8/2009 |
| WO | 2011056307 A2 | 5/2011 |
| WO | 2011073516 A1 | 6/2011 |
| WO | 2011132174 A1 | 10/2011 |
| WO | 2012060611 A2 | 5/2012 |

OTHER PUBLICATIONS

Notice of Allowance dated Jun. 14, 2017; U.S. Appl. No. 14/298,289, filed Jun. 6, 2014; 8 pages.

Notice of Allowance dated Jun. 30, 2017; U.S. Appl. No. 14/952,574, filed Nov. 25, 2015; 24 pages.

Office Action dated Aug. 11, 2017; U.S. Appl. No. 15/048,669, filed Feb. 19, 2016; 37 pages.

Canadian Office Action; Application No. 2,799,293; dated May 17, 2017; 4 pages.

European Examination Report; Application No. 11733699.0; dated Jul. 19, 2017; 4 pages.

Canadian Office Action; Application No. 2,848,754; dated Jul. 28, 2017; 4 pages.

Chinese Office Action as Received in Co-pending Application No. 201280044612.X dated Jun. 23, 2017; 5 pages. (No English translation available).

European Examination Report; Application No. 12831400.2; dated Jun. 16, 2017; 6 pages.

Canadian Office Action; Application No. 2,872,882; dated Jun. 6, 2017; 3 pages.

Office Action dated Jan. 2, 2013; U.S. Appl. No. 12/780,603, filed May 14, 2010; 35 pages.

Final Office Action dated Jun. 5, 2013; U.S. Appl. No. 12/780,603, filed May 14, 2010; 30 pages.

Office Action dated Dec. 17, 2013; U.S. Appl. No. 12/780,603, filed May 14, 2010; 27 pages.

Final Office Action dated Jun. 3, 2014; U.S. Appl. No. 12/780,603, filed May 14, 2010; 28 pages.

Notice of Allowance dated Sep. 2, 2014; U.S. Appl. No. 12/780,603, filed May 14, 2010; 7 pages.

Office Action dated Jun. 8, 2012; U.S. Appl. No. 12/780,709, filed May 14, 2010; 6 pages.

(56) References Cited

OTHER PUBLICATIONS

Office Action dated Aug. 23, 2012; U.S. Appl. No. 12/780,709, filed May 14, 2010; 13 pages.
Notice of Allowance dated Jan. 18, 2013; U.S. Appl. No. 12/780,709, filed May 14, 2010; 11 pages.
Office Action dated Apr. 3, 2012; U.S. Appl. No. 12/780,722, filed May 14, 2010; 15 pages.
Notice of Allowance dated Oct. 19, 2012; U.S. Appl. No. 12/780,722, filed May 14, 2010; 6 pages.
Notice of Allowance dated Feb. 5, 2013; U.S. Appl. No. 12/780,722, filed May 14, 2010; 6 pages.
Office Action dated May 2, 2012; U.S. Appl. No. 12/780,614, filed May 14, 2010; 5 pages.
Office Action dated Jul. 19, 2012; U.S. Appl. No. 12/780,614, filed May 14, 2010; 14 pages.
Office Action dated Nov. 16, 2012; U.S. Appl. No. 12/780,614, filed May 14, 2010; 6 pages.
Office Action dated Mar. 25, 2013; U.S. Appl. No. 12/780,614, filed May 14, 2010; 10 pages.
Final Office Action dated Jul. 19, 2013; U.S. Appl. No. 12/780,614, filed May 14, 2010; 7 pages.
Notice of Allowance dated Oct. 31, 2013; U.S. Appl. No. 12/780,614, filed May 14, 2010; 7 pages.
Office Action dated Nov. 16, 2012; U.S. Appl. No. 13/045,622, filed Mar. 11, 2011; 19 pages.
Final Office Action dated Jul. 12, 2013; U.S. Appl. No. 13/045,622, filed Mar. 11, 2011; 17 pages.
Office Action dated Oct. 11, 2012; U.S. Appl. No. 13/045,658, filed Mar. 11, 2011; 11 pages.
Final Office Action dated May 15, 2013; U.S. Appl. No. 13/045,658, filed Mar. 11, 2011; 11 pages.
Advisory Action dated Jul. 26, 2013; U.S. Appl. No. 13/045,658, filed Mar. 11, 2011; 3 pages.
Office Action dated Sep. 23, 2016; U.S. Appl. No. 13/045,658, filed Mar. 11, 2011; 77 pages.
Notice of Allowance dated Nov. 18, 2016; U.S. Appl. No. 13/045,658, filed Mar. 11, 2011; 7 pages.
Office Action dated Jul. 12, 2013; U.S. Appl. No. 13/234,799, filed Sep. 16, 2011; 16 pages.
Notice of Allowance dated Jan. 30, 2014; U.S. Appl. No. 13/234,799, filed Sep. 16, 2011; 7 pages.
Office Action dated Apr. 20, 2015; U.S. Appl. No. 14/298,289, filed Jun. 6, 2014; 10 pages.
Final Office Action dated Aug. 5, 2015; U.S. Appl. No. 14/298,289, filed Jun. 6, 2014; 34 pages.
Advisory Action dated Oct. 15, 2015; U.S. Appl. No. 14/298,289, filed Jun. 6, 2014; 3 pages.
Office Action dated Nov. 16, 2015; U.S. Appl. No. 14/298,289, filed Jun. 6, 2014; 13 pages.
Final Office Action dated Mar. 21, 2016; U.S. Appl. No. 14/298,289, filed Jun. 6, 2014; 21 pages.
Advisory Action dated Jun. 8, 2016; U.S. Appl. No. 14/298,289, filed Jun. 6, 2014; 4 pages.
Office Action dated Aug. 23, 2016; U.S. Appl. No. 14/298,289, filed Jun. 6, 2014; 8 pages.
Final Office Action dated Jan. 3, 2017; U.S. Appl. No. 14/298,289, filed Jun. 6, 2014; 13 pages.
Office Action dated Mar. 30, 2017; U.S. Appl. No. 14/298,289, filed Jun. 6, 2014; 7 pages.
Office Action dated Jul. 11, 2013; U.S. Appl. No. 13/407,444, filed Feb. 28, 2012; 14 pages.
Office Action dated Dec. 31, 2013; U.S. Appl. No. 13/407,444, filed Feb. 28, 2012; 11 pages.
Final Office Action dated Jun. 3, 2014; U.S. Appl. No. 13/407,444, filed Feb. 28, 2012; 11 pages.
Notice of Allowance dated Sep. 17, 2014; U.S. Appl. No. 13/407,444, filed Feb. 28, 2012; 5 pages.
Office Action dated Feb. 4, 2014; U.S. Appl. No. 13/548,864, filed Jul. 13, 2012; 15 pages.
Final Office Action dated Jul. 11, 2014; U.S. Appl. No. 13/548,864, filed Jul. 13, 2012; 10 pages.
Office Action dated Oct. 30, 2014; U.S. Appl. No. 13/548,864, filed Jul. 13, 2012; 10 pages.
Notice of Allowance dated May 1, 2015; U.S. Appl. No. 13/548,864, filed Jul. 13, 2012; 14 pages.
Office Action dated Jan. 14, 2014; U.S. Appl. No. 13/469,618, filed May 11, 2012; 28 pages.
Final Office Action dated Jul. 9, 2014; U.S. Appl. No. 13/469,618, filed May 11, 2012; 31 pages.
Office Action dated Jan. 21, 2015; U.S. Appl. No. 13/469,618, filed May 11, 2012; 26 pages.
Notice of Allowance dated Jul. 23, 2015; U.S. Appl. No. 13/469,618, filed May 11, 2012; 15 pages.
Office Action dated Dec. 31, 2014; U.S. Appl. No. 13/547,880, filed Jul. 12, 2012; 19 pages.
Final Office Action dated Aug. 27, 2015; U.S. Appl. No. 13/547,880, filed Jul. 12, 2012; 26 pages.
Advisory Action dated Dec. 2, 2015; U.S. Appl. No. 13/547,880, filed Jul. 12, 2012; 3 pages.
McCann, Stephen, et al.; U.S. Appl. No. 15/811,259, filed Nov. 13, 2017; Title: Extended Service Set Transitions in Wireless Networks; 45 pages.
McCann, Stephen, et al.; U.S. Appl. No. 15/785,121, filed Oct. 16, 2017; Title: Discovering Network Information Available via Wireless Networks; 65 pages.
Final Office Action dated Dec. 8, 2017; U.S. Appl. No. 13/547,880, filed Jul. 12, 2012; 36 pages.
Notice of Allowance dated Dec. 8, 2017; U.S. Appl. No. 15/048,669, filed Feb. 19, 2016; 10 pages.
Chinese Office Action; Application No. 201280066681.0; dated Sep. 11, 2017; 18 pages.
European Examination Report; Application No. 13816111.2; dated Dec. 4, 2017; 6 pages.
European Examination Report; Application No. 13817511.2; dated Oct. 24, 2017; 4 pages.
Advisory Action dated Jan. 20, 2016; U.S. Appl. No. 13/547,880, filed Jul. 12, 2012; 4 pages.
Office Action dated Jun. 13, 2016; U.S. Appl. No. 13/547,880, filed Jul. 12, 2012; 58 pages.
Final Office Action dated Dec. 14, 2016; U.S. Appl. No. 13/547,880, filed Jul. 12, 2012; 33 pages.
Advisory Action dated Mar. 13, 2017; U.S. Appl. No. 13/547,880, filed Jul. 12, 2012; 11 pages.
Office Action dated Mar. 28, 2017; U.S. Appl. No. 13/547,880, filed Jul. 12, 2012; 24 pages.
Office Action dated Jun. 30, 2015; U.S. Appl. No. 13/836,759, filed Mar. 15, 2013; 24 pages.
Notice of Allowance dated Nov. 18, 2015; U.S. Appl. No. 13/836,759, filed Mar. 15, 2013; 33 pages.
Office Action dated Mar. 31, 2016; U.S. Appl. No. 14/854,685, filed Sep. 15, 2015; 56 pages.
Final Office Action dated Sep. 16, 2016; U.S. Appl. No. 14/854,685, filed Sep. 15, 2015; 18 pages.
Notice of Allowance dated Nov. 23, 2016; U.S. Appl. No. 14/854,685, filed Sep. 15, 2015; 13 pages.
Office Action dated Apr. 8, 2016; U.S. Appl. No. 14/952,574, filed Nov. 25, 2015; 75 pages.
Final Office Action dated Oct. 20, 2016; U.S. Appl. No. 14/952,574, filed Nov. 25, 2015; 36 pages.
Advisory Action dated Jan. 11, 2017; U.S. Appl. No. 14/952,574, filed Nov. 25, 2015; 2 pages.
Office Action dated Feb. 15, 2017; U.S. Appl. No. 14/952,574, filed Nov. 25, 2015; 28 pages.
PCT International Search Report; Application No. PCT/IB2011/051040; dated Jun. 30, 2011; 4 pages.
PCT Written Opinion of the International Searching Authority; Application No. PCT/IB2011/051040; dated Jun. 30, 2011; 7 pages.
Taiwan Office Action; Application No. 100108467; dated Aug. 9, 2013; 12 pages.
PCT International Search Report; Application No. PCT/IB2011/051044; dated Jun. 30, 2011; 4 pages.

(56) References Cited

OTHER PUBLICATIONS

PCT Written Opinion of the International Searching Authority; Application No. PCT/IB2011/051044; dated Jun. 30, 2011; 7 pages.
Canadian Office Action; Application No. 2,793,375; dated Oct. 18, 2013; 3 pages.
Canadian Office Action; Application No. 2,793,375; dated Jun. 25, 2014; 3 pages.
Canadian Office Action; Application No. 2,793,375; dated Jul. 10, 2015; 5 pages.
Canadian Office Action; Application No. 2,793,375; dated May 2, 2016; 6 pages.
Canadian Office Action; Application No. 2,793,375; dated Apr. 7, 2017; 4 pages.
Chinese Office Action; Application No. 201180023969.5; dated Oct. 30, 2014; 20 pages.
Chinese Office Action; Application No. 201180023969.5; dated Jul. 20, 2015; 10 pages.
European Examination Report; Application No. 11715273.6; dated Jan. 13, 2016; 6 pages.
European Examination Report; Application No. 11715273.6; dated Jan. 25, 2017; 4 pages.
Japanese Office Action; Application No. 2012-557644; dated Oct. 17, 2013; 5 pages.
Japanese Office Action as Received in Co-pending Application No. 2014-019062 dated Nov. 21, 2014; 2 pages. (No English translation available).
PCT International Search Report; Application No. PCT/IB2010/002932; dated May 9, 2011; 3 pages.
PCT Written Opinion of the International Searching Authority; Application No. PCT/IB2010/002932; dated May 9, 2011; 6 pages.
PCT International Search Report; Application No. PCT/IB2011/001006; dated Aug. 3, 2011; 4 pages.
PCT Written Opinion of the International Searching Authority; Application No. PCT/IB2011/001006; dated Aug. 3, 2011; 9 pages.
Canadian Office Action; Application No. 2,799,291; dated May 28, 2014; 3 pages.
Canadian Office Action; Application No. 2,799,291; dated Jun. 2, 2015; 4 pages.
Chinese Office Action; Application No. 201180033223.2; dated Jan. 22, 2015; 15 pages.
Chinese Office Action; Application No. 201180033223.2; dated Oct. 10, 2015; 12 pages.
European Examination Report; Application No. 11726170.1; dated May 9, 2016; 8 pages.
PCT International Search Report; Application No. PCT/IB2011/001008; dated Aug. 3, 2011; 4 pages.
PCT Written Opinion of the International Searching Authority; Application No. PCT/IB2011/001008; dated Aug. 3, 2011; 9 pages.
Canadian Office Action; Application No. 2,799,292; dated May 27, 2014; 3 pages.
Canadian Office Action; Application No. 2,799,292; dated Jun. 8, 2015; 4 pages.
Canadian Office Action; Application No. 2,799,292; dated Feb. 23, 2016; 4 pages.
Chinese Office Action; Application No. 201180033260.3; dated Jun. 3, 2015; 21 pages.
Chinese Office Action; Application No. 201180033260.3; dated Jan. 20, 2016; 7 pages.
European Examination Report; Application No. 11726171.9; dated May 9, 2016; 8 pages.
PCT International Search Report; Application No. PCT/IB2011/001023; dated Oct. 14, 2011; 3 pages.
PCT Written Opinion of the International Searching Authority; Application No. PCT/IB2011/001023; dated Oct. 14, 2011; 5 pages.
Canadian Office Action; Application No. 2,799,295; dated Oct. 31, 2014; 4 pages.
Montemurro, Michael Peter, et al.; U.S. Appl. No. 15/460,991, filed Mar. 16, 2017; Title: Negotiation of Quality of Service (QoS) Information for Network Mangement Traffic in a Wireless Local Area Network (WLAN); 49 pages.

Hiller, T., et al.; "A Container Type for the Extensible Authentication Protocol (EAP)"; Network Working Group; draft-hiller-eap-tlv-01.txt; May 2003; 16 pages.
McCann, Stephen; "Emergency URN Information"; IEEE 802.11-10/0026r0; Jan. 18, 2010; 6 pages.
Rosen, B., et al.; "Framework for Emergency Calling using Internet Multimedia"; draft-ietf-ecrit-framework-10; Jul. 27, 2009; 74 pages.
Schulzrinne, H., et al.; "Extensions to the Emergency Services Architecture for dealing with Unauthenticated and Unauthorized Devices"; draft-ietf-ecrit-unauthenticated-access-06.txt; Apr. 30, 2013; 38 pages.
"IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications"; IEEE Computer Society; IEEE Std 802.11e; Nov. 11, 2005; 211 pages.
Li, Wei, et al.; "A Reliable Active Scanning Scheme for the IEEE 802.11 Mac Layer Handoff"; IEEE; 2003; 4 pages.
Montemurro, Michael; "TGae Requirements and Use Cases"; IEEE 802.11-10/0093r5; Jan. 21, 2010; 6 pages.
Bajko, Gabor; "Tutorial on Location and Emergency Services"; Nokia; Sep. 10, 2008; 45 pages.
"IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications"; IEEE Computer Society; IEEE Draft P802.11-REVmb/D9.2; Jul. 2011; 2778 pages; (Part 1: pp. 1-1369).
"IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications"; IEEE Computer Society; IEEE Draft P802.11-REVmb/D9.2; Jul. 2011; 2778 pages; (Part 2: pp. 1370-2778).
"IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications"; IEEE Computer Society; IEEE Std 802.11u; Feb. 25, 2011; 208 pages.
"IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications"; IEEE Computer Society; IEEE Std 802.11k; Jun. 12, 2008; 244 pages.
"IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications"; IEEE Computer Society; IEEE Std 802.11; Mar. 29, 2012; 2793 pages.
Lin, Chen-Han, et al.; "Mobile Intelligent Agent Technologies to Support Intelligent Handover Strategy"; Proceedings of the Workshop on Wireless, Ad Hoc and Sensor Network; vol. 1; 2005; 8 pages.
"Wi-Fi Peer-to-Peer (P2P) Technical Specification"; Draft Version 1.14; Wi-Fi Alliance Technical Committee P2P Task Group; Jun. 25, 2010; 22 pages.
"Draft Standard for Local and Metropolitan Area Networks: Media Independent Handover Services"; IEEE P802.21/D8.0; Dec. 2007; 343 pages.
Barber, Phillip, et al.; "GAS Version Control in 11ai"; Document: IEEE 802.11-11/1498-01-00ai; Oct. 24, 2011; 16 pages.
Bumiller, George; "Notes on Interworking with External Networks"; Document: IEEE 802.11-09/1272r2; Jul. 22, 2010; 156 pages.
Cao, Z., et al.; "DHCPv4 and DHCPv6 Options for Access Network Query Protocol Servers"; draft-cao-dhc-anqp-option-00; Jul. 9, 2012; 8 pages.
Kneckt, Jarkko, et al.; "Active Scanning Enabling FILS"; IEEE 802.11-11/1619r1; Jan. 16, 2012; 15 pages.

(56) References Cited

OTHER PUBLICATIONS

Campbell, Andrew T., et al.; "Design, Implementation, and Evaluation of Cellular IP"; IEEE Personal Communications; Aug. 2000; 8 pages.
Nakano, Hiroki; "Upper Layer Data on Management Frames"; IEEE 802.11-11/1003r1; Jul. 18, 2011; 17 pages.
Bajko, Gabor; "IP Address Configuration During Association"; IEEE P802.11; Jul. 20, 2011; 5 pages.
Office Action dated Jun. 29, 2012; U.S. Appl. No. 12/780,603, filed May 14, 2010; 37 pages.
Canadian Office Action; Application No. 2,799,295; dated Feb. 24, 2016; 4 pages.
Chinese Office Action; Application No. 201180033296.1; dated Dec. 31, 2014; 14 pages.
Chinese Office Action; Application No. 201180033296.1; dated Dec. 16, 2015; 8 pages.
European Examination Report; Application No. 11726172.7; dated Feb. 10, 2015; 4 pages.
PCT International Search Report; Application No. PCT/IB2011/001018; dated Dec. 5, 2011; 3 pages.
PCT Written Opinion of the International Searching Authority; Application No. PCT/IB2011/001018; dated Dec. 5, 2011; 6 pages.
Canadian Office Action; Application No. 2,799,293; dated Jun. 16, 2014; 2 pages.
Canadian Office Action; Application No. 2,799,293; dated Jul. 13, 2015; 6 pages.
Canadian Office Action; Application No. 2,799,293; dated Jun. 10, 2016; 5 pages.
Chinese Office Action; Application No. 201180033197.3; dated Dec. 12, 2014; 20 pages.
Chinese Office Action; Application No. 201180033197.3; dated Aug. 18, 2015; 16 pages.
European Examination Report; Application No. 11733699.0; dated Jan. 15, 2016; 6 pages.
European Examination Report; Application No. 11733699.0; dated Sep. 6, 2016; 4 pages.
PCT International Search Report; Application No. PCT/CA2012/050635; dated Dec. 10, 2012; 2 pages.
PCT Written Opinion of the International Searching Authority; Application No. PCT/CA2012/050635; dated Dec. 10, 2012; 7 pages.
Canadian Office Action; Application No. 2,848,754; dated Sep. 24, 2015; 4 pages.
Canadian Office Action; Application No. 2,848,754; dated Aug. 15, 2016; 5 pages.
Chinese Office Action; Application No. 201280044612.X; dated Nov. 28, 2016; 15 pages.
European Extended Search Report; Application No. 12831400.2; dated Jul. 3, 2015; 10 pages.
Korean Office Action; Application No. 10-2014-7008921; dated Mar. 23, 2015; 5 pages.
Korean Notice of Allowance; Application No. 10-2014-7008921; dated Sep. 18, 2015; 3 pages.
PCT International Search Report; Application No. PCT/CA2012/050793; dated Jan. 16, 2013; 3 pages.
PCT Written Opinion of the International Searching Authority; Application No. PCT/CA2012/050793; dated Jan. 16, 2013; 5 pages.
Chinese Office Action; Application No. 201280066681.0; dated Mar. 10, 2017; 21 pages.
European Extended Search Report; Application No. 12847065.5; dated Jul. 13, 2015; 11 pages.
Korean Office Action; Application No. 10-2014-7015745; dated Apr. 29, 2015; 11 pages.
Taiwan Search Report; Application No. 102124777; dated Dec. 9, 2014; 1 page.
PCT International Search Report; Application No. PCT/CA2013/050540; dated Sep. 17, 2013; 3 pages.
PCT Written Opinion of the International Searching Authority; Application No. PCT/CA2013/050540; dated Sep. 17, 2013; 3 pages.
European Extended Search Report; Application No. 13816111.2; dated Feb. 3, 2016; 7 pages.
European Examination Report; Application No. 13816111.2; dated Mar. 29, 2017; 4 pages.
Taiwan Office Action; Application No. 102116774; dated Oct. 27, 2014; 16 pages.
Taiwan Office Action; Application No. 102116774; dated Jun. 12, 2015; 16 pages.
PCT International Search Report; Application No. PCT/CA2013/050362; dated Aug. 2, 2013; 4 pages.
PCT Written Opinion of the International Searching Authority; Application No. PCT/CA2013/050362; dated Aug. 2, 2013; 5 pages.
Canadian Office Action; Application No. 2,872,882; dated Sep. 28, 2016; 4 pages.
European Extended Search Report; Application No. 13788377.3; dated Dec. 21, 2015; 8 pages.
European Examination Report; Application No. 13788377.3; dated Oct. 10, 2016; 6 pages.
Taiwan Search Report; Application No. 102122238; dated Dec. 24, 2014; 1 page.
Taiwan Search Report; Application No. 102122238; dated Sep. 21, 2015; 7 pages.
PCT International Search Report; PCT/CA2013/050539; dated Sep. 16, 2013; 3 pages.
PCT Written Opinion of the International Searching Authority; PCT/CA2013/050539; dated Sep. 16, 2013; 4 pages.
European Extended Search Report; Application No. 13817511.2; dated Feb. 12, 2016; 9 pages.
European Examination Report; Application No. 13817511.2; dated Mar. 8, 2017; 5 pages.
PCT International Search Report; Application No. PCT/CA2014/050060; dated Apr. 15, 2014; 3 pages.
PCT Written Opinion of the International Searching Authority; Application No. PCT/CA2014/050060; dated Apr. 15, 2014; 7 pages.
European Extended Examination Report; Application No. 14749467.8; dated Jun. 22, 2016; 8 pages.
Office Action dated Mar. 22, 2018; U.S. Appl. No. 15/811,259, filed Nov. 13, 2017; 70 pages.
Chinese Office Action; Application No. 201280066681.0; dated Jan. 15, 2018; 12 pages.
Office Action dated Jun. 13, 2018; U.S. Appl. No. 13/547,880, filed Jul. 12, 2012; 39 pages.
European Extended Search Report; Application No. 18157024.3; dated May 25, 2018; 10 pages.
European Summons to Attend Oral Proceedings; Application No. 12831400.2; dated May 25, 2018; 9 pages.
European Examination Report; Application No. 138161112, dated May 14, 2018; 4 pages.
European Examination Report; Application No. 13788377.3; dated Jun. 11, 2018; 7 pages.
Office Action dated Sep. 11, 2018; U.S. Appl. No. 15/785,121, filed Oct. 16, 2017; 59 pages.
Indian Office Action; Application No. 7976/CHENP/2012; dated Aug. 30, 2018; 6 pages.
Canadian Office Action; Application No. 2,854,947; dated Aug. 9, 2018; 2 pages.
European Examination Report; Application No. 12847065.5; dated Oct. 12, 2018; 6 pages.
European Extended Search Report; Application No. 18166755.1; dated Aug. 22, 2018; 6 pages.

\* cited by examiner

COMMUNICATION LAYER ARCHITECTURE

WIRELESS NETWORK SERVICE TRANSACTION PROTOCOL

CROSS-REFERENCE TO RELATED APPLICATIONS

This application is a continuation of U.S. patent application Ser. No. 14/854,685 filed Sep. 15, 2015 by Stephen McCann, et al. entitled, "Wireless Network Service Transaction Protocol", which is a continuation of U.S. Pat. No. 9,137,621 issued on Sep. 15, 2015 entitled, "Wireless Network Service Transaction Protocol", all of which are incorporated by reference herein as if reproduced in their entirety.

BACKGROUND

Wireless network deployments, such as wireless local area networks ("WLANs"), allow mobile devices to access network and Internet services when within proximity of wireless communication signals of those wireless networks. Through network discovery communications with the WLAN, a mobile device, wireless terminal, or station ("STA") may obtain network information about an access point or access network. Access Network Query Protocol ("ANQP") may allow the mobile device to request additional network information prior to establishing network connectivity. Such network information may include access to particular subscription service provider ("SSP") networks ("SSPN"), roaming agreements to allow connections from wireless clients associated with different SSPs, authentication capabilities to enable secure communications, support for emergency services or support for particular types of multimedia access (e.g., audio and/or video streaming, downloading, etc.). However, other network information not provided by ANQP, such as the availability of third party services, may only be provided following the establishment of a connection or association with that network. Depending on the services available, a mobile device may need to disconnect or disassociate with that network and pursue a different network. Accordingly, there may not be a way of discovering services available for a particular network without authenticating and associating with the network.

DETAILED DESCRIPTION

Figure 1:
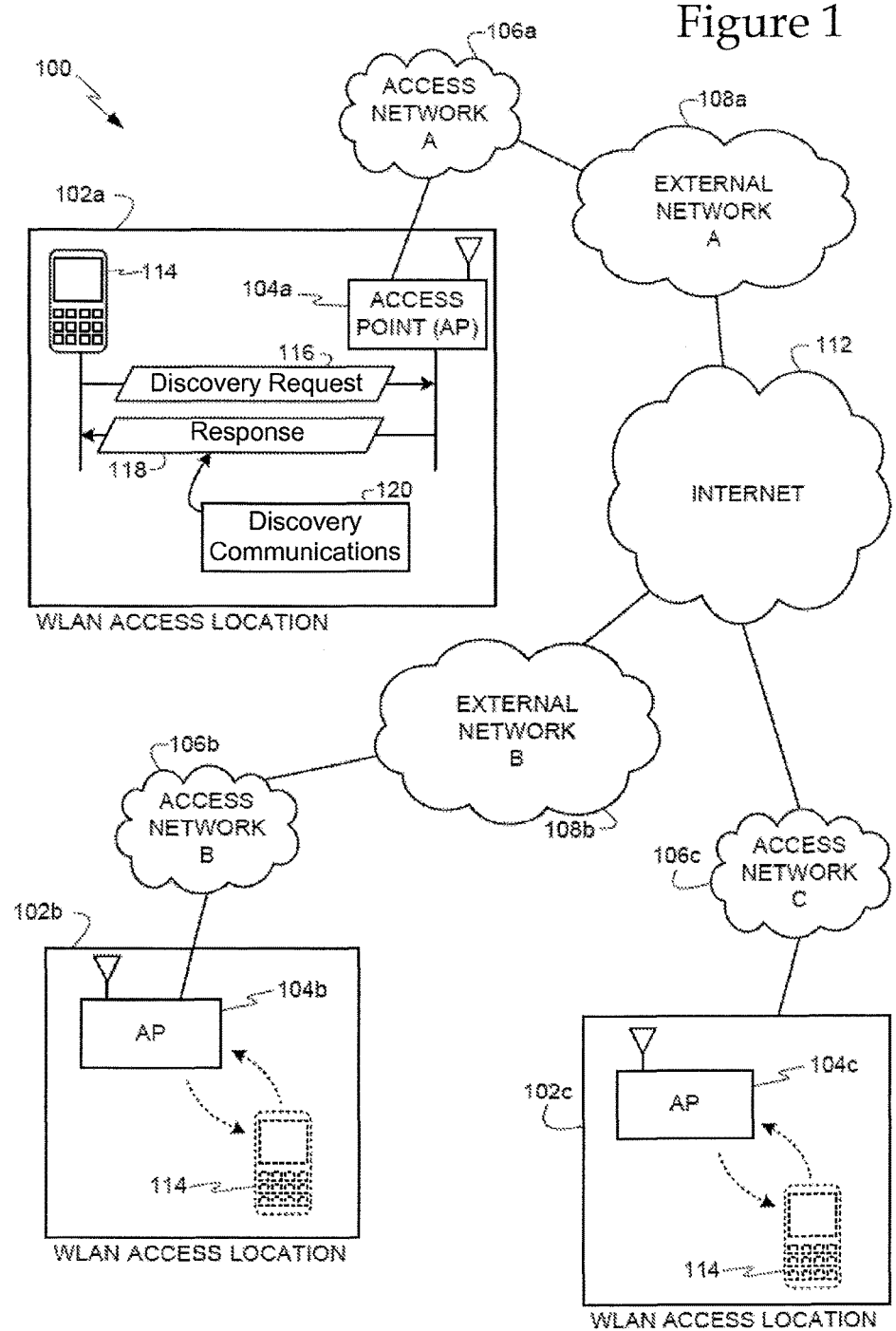
FIG. 1 illustrates a communication network.

The disclosed systems and methods allow mobile devices to retrieve service information from a local area network ("LAN"), such as a wireless LAN ("WLAN"). The service information may be requested and received from the WLAN before association with that WLAN. In other words, pre-association/discovery information from the mobile device is sent to the WLAN to determine available services. The service request may include a query for certain information. An advertisement protocol, such as the service transaction protocol ("STP"), may be utilized for transmitting the requests/responses for a service before associating with a network. In other words, the mobile device may be able to identify the services available to the network prior to establishing network capability (i.e., prior to the exchange of any authentication parameters between the device and the network as well prior to the establishment of a recognized session between the device and the network), which may generally be referred to as a pre-association state.

A service request from a mobile device may include a request for services for the mobile device. The services may include any applications or necessary components for those applications used by the mobile device. Accordingly, the running of an application on a mobile device may need certain requirements and/or resources from the network for full operation, and those requirements and/or resources may be referred to as services. Exemplary services include the connection to a voice messaging service, finding a printer (e.g. finding a three-dimensional ("3D") printer), or finding an emergency service. There may be many other types of services available to the mobile device. In one embodiment, a service may be considered to be third party data provider that is connected to by an application and/or the mobile device. Additional exemplary services may include the downloading of drivers to the mobile device to enable use of a feature. For example, a 3D printer may require a driver to be downloaded. An additional example is that specific 3D printer drivers for a Macintosh™ computing device may be available, which may be an important decision point for that device to choose that particular network. Cellular system services such as IP Multimedia Subsystem ("IMS"), and home operator services are additional examples of services.

STP may be an advertisement protocol similar to Access Network Query Protocol ("ANQP"), which allows a mobile device to retrieve service information or available services about a network prior to associating with that network. Service information may generally refer to data transmissions related to services provided over a network. For example, service information may be transmitted to a mobile device regarding the availability of resources that software on that mobile device requires. Example services may include IMS, e911, 3D printing, and text messaging. As described, service information may be included in both service requests (also queries) and service responses (also query answers). ANQP supports information retrieval from an Advertisement Server that supports a Generic Advertisement Service ("GAS"). ANQP and GAS are defined in IEEE® 802.11u™ and also IEEE® 802.11-2012™, the entire disclosures of which is incorporated by reference. ANQP and GAS are further described below.

Communications prior to network association may be referred to discovery communications or communications while a mobile device (e.g., a STA) is in a pre-associated state of operation in accordance with various communication standards such as the IEEE® (Institute for Electrical and Electronics Engineers) 802.11 standard. For example, as described in IEEE 802.11, a pre-associated state of a mobile device may include states such as, but not limited to, a "State 1: Initial start state, unauthenticated, unassociated" in which the device has neither authenticated or associated with a network and a "State 2: Authenticated, no associated" in which a mobile device has authenticated with a network but not yet associated with the network.

ANQP may not include the ability to include free string queries, which may also be referred to as free form queries and include queries of an undefined content and length.

Conversely, STP may provide a mechanism for the submission of free string queries and for receiving an answer in response to the free string query. In other words strings that conform to UNIX POSIX query formats, e.g. "print", where the "*" is a query character allowing any string to match it. In this example the following service descriptions may match this query string: "printer", "printer at the store", "printer service", "printer 3d". This free string or free form query allows for the discovery of services that may not otherwise be easily discoverable. It also provides a mechanism for more accurately identifying services and for greater flexibility because the query string does not need to be specific. Using the POSIX format, allows a rich variety of queries to be constructed, so for example, the query "[0-9] *3" would match any string of exactly 3 number characters.

Accordingly, ANQP may not allow free form queries (e.g. service requests) to be sent to the network. The STP may be an advertisement protocol in which free string queries, such as the service query messages, are communicated prior to network association. In particular, STP may be implemented as an advertisement protocol enabling it to be carried, over the IEEE 802.11 air interface, by an existing GAS mechanism.

Media Independent Handover ("MIH") is another protocol under IEEE 802.21 that does include a different type of service discovery. The MIH advertisement protocol may be transported by GAS and may include a Media Independent Information Service ("MIIS"), which is defined within the IEEE 802.21 standard. The MIIS provides a set of information elements ("IEs") and a query/response mechanism for information transfer before the mobile device is authenticated. In one embodiment, the queries comprise specific messages (e.g. "MIH_Capability_Discover") that allow the discovery of MIH capabilities within an MIH Server, such as the list of available commands and available events. However, MIH only works for the IEEE 802.21 standard and does not work for WLAN connections. Further, IEEE 802.21 requires a device to pre-register before using its service discovery, which prevents a pre-association discovery as is performed by STP. In other words, the pre-registration requirement requires the device to first connect to the network before the services can be discovered, while STP provides the ability to discover services prior to association (i.e., a connection with the network such that data traffic may be passed between the device and the network).

Figure 5:
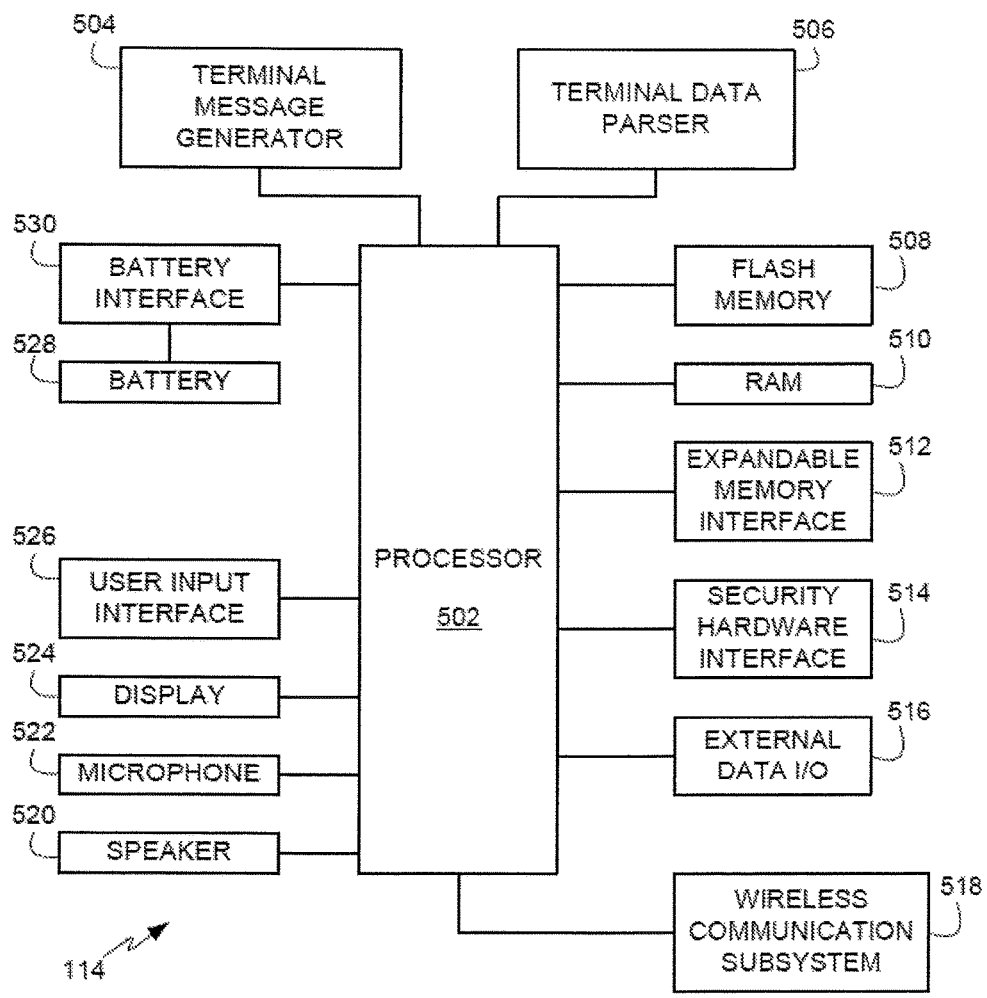
FIG. 5 illustrates a mobile device ("STA")

Mobile devices that communicate prior to network association may include mobile communication devices, mobile computing devices, or any other device capable of communicating wirelessly with a wireless network. Such devices may also be referred to as terminals, mobile devices, stations ("STA") or user equipment, and may also include mobile smart phones (e.g., a BlackBerry® smart phone or BlackBerry® Playbook), wireless personal digital assistants ("PDA"), machine to machine equipment, equipment within a smart grid ("SmartGrid"), equipment within a mesh network (an ad-hoc or peer network), laptop/notebook/netbook computers with wireless adapters, etc. FIG. 5 illustrates one embodiment of a mobile device or terminal.

Some devices may discover information about the external networks (e.g., subscription service provider networks ("SSPNs")) may include a wireless local area network ("WLAN"). The network discovery and connectivity in a WLAN may occur through standards that define access, control and communications in networks, such as the communication standard known as IEEE® (Institute for Electrical and Electronics Engineers) 802.11, which, among other things, defines an amendment entitled "interworking with external networks." Alternatively, the network discovery and connectivity may be subject to other parts of the IEEE 802.11 standard and other wireless communication standards including WLAN standards including any IEEE® 802.xx standard (e.g. IEEE 802.15, IEEE 802.16, IEEE 802.19, IEEE 802.20, and IEEE 802.22), personal area network standards, wide area network standards, or cellular communication standards.

One exemplary network may be a WLAN and is described below. Alternatively, the devices may discover information about other networks through other protocols and architectures, including a cellular network or a WiMax network. The network may comprise a publicly accessible network, such as the Internet, a private network, such as an intranet, or combinations thereof, and may utilize a variety of networking protocols now available or later developed including, but not limited to TCP/IP based networking protocols. The networks may include any communication method or employ any form of machine-readable media for communicating information from one device to another.

The discovery of service information may be implemented in many environments providing WLAN access for network connectivity or in WLAN access locations or environments in which it may be expected that one or more users carrying respective mobile devices will associate with (i.e., join or connect to) and disassociate from a wireless network, access point, or WLAN as they enter and exit the WLAN access locations or environments.

In a WLAN environment, service discovery may include, for example, an active scan procedure or passive scan procedure performed by the mobile device. Typically, scanning procedures within a WLAN environment involve scanning for (i.e., determining) candidate STAs (e.g., mobile device, APs or mesh stations "MSTAs") with which the mobile device may associate with during an association procedure or re-associate with during a re-association procedure. In a passive scan procedure, a mobile device may "listen for" (i.e., receive or detect) beacon frames periodically transmitted from another STA (e.g., a mobile device, an AP or MSTA). In an active scan procedure, the mobile device generates one or more probe request frames. A STA (e.g., a mobile device, an AP or MSTA) that receives a probe request frame, in response, transmits a probe response frame. The mobile device then processes any received probe response frames.

In some WLAN environments, service discovery may further include an IEEE 802.11 authentication procedure. In other words, service discovery may include a successful authentication, an unsuccessful authentication, or a deauthentication of a mobile device with one of the STAs that were identified during the scanning procedure discussed above. Stated another way, service discovery may include: a transition of the mobile device from "State 1" to "State 2" based on a successful authentication of the mobile device; an unchanged state (i.e., remaining in "State 1") of the mobile device if authentication of the mobile device was unsuccessful; or a transition of the mobile device from "State 2" to "State 1" based on a deauthentication of the mobile device.

Some WLAN locations or environments may be known as "hotspots" in reference to a location or environment that is within communication range of WLAN signals. WLAN locations or environments may include coffee shops, retail stores, home locations (e.g. homes and apartments), educational facilities, office environments, airports, public transportation stations and vehicles, hotels, etc. Such WLANs are often implemented as access networks that provide access to publicly accessible networks and may be associated with, or support access to, external networks (or WLAN-supported networks) owned and/or operated by subscription-based service providers. For example, an external network can be owned and/or operated by an Internet-access service provider or a telecommunications carrier/service provider that provides subscription-based Internet access for a fee (e.g., a monthly fee). In some systems, a subscriber/user may subscribe to such a service can use wireless network access and/or Internet-access services based on such a subscription when the subscriber is in communication proximity of the WLAN with an appropriate mobile device. In some instances, different WLANs may provide access to different types of service information. For example, some WLANs may provide access to particular subscription service provider networks, and some WLANs may support roaming agreements to allow connections from mobile devices associated with different SSPs.

During some service discovery processes a mobile device may transmit a query for service information from the wireless local area network ("WLAN"). The terminal may obtain service information or available services to determine whether to continue with a connection process to associate with that network. As discussed above, service information may refer to data transmitted over a network regarding the availability of services.

In accordance with the embodiments described herein, mobile devices may request service information from WLANs using STP. In one embodiment, STP is an advertisement protocol that utilizes GAS. In particular, GAS may serve as a transport mechanism, at layer-2 (see e.g. FIG. 2), for an advertisement protocol, such as STP. The advertisement protocol may connect the mobile device to one of several interworked servers. The advertisement protocol allows the transmission of frames between a mobile device and a server in the network prior to network connectivity. For example, GAS provides support for operations such as network selection by a mobile device, as well as for communication between the mobile device and other information resources in the network before the mobile device associates with a WLAN. The mobile device may be connected to a layer-2 radio service, without exchanging any authentication parameters or without having a recognized session (because no session keys are established and no internet protocol address is assigned). When in compliance with the IEEE 802.11 standard, no data traffic is allowed in this state.

Other layer-2 transport mechanisms or even authentication mechanisms may be used. For example, the Extensible Authentication Protocol ("EAP") may be used to carry the advertisement protocol, as an alternative to GAS. The advertisement protocol information would be encapsulated within a suitable EAP-TLV (type length value) method frame (or alternative EAP method frame) and transported by the EAP. Use of secure credentials exchanged during the EAP transactions would also provide a level of security for any information carried within the advertisement protocol. For example, if any EAP method using SIM based credentials (e.g. EAP-SIM, EAP-AKA, or EAP-AKA) were to be the authentication protocol, any advertisement protocol information encapsulated (i.e. securely carried) within a suitable EAP-TLV frame during the same EAP transaction may also be protected by the SIM credentials.

STP is an exemplary advertisement protocol utilized for transmitting service request messages. STP is configured for submitting service queries and receiving responses for those service queries. In one embodiment, STP includes the capabilities of ANQP in addition to the service request capabilities. ANQP operates as a query and response protocol used by a mobile device to discover a range of information from a server including accessible roaming partners, internet protocol address type, and other metadata useful in the mobile device's network selection process. In addition to being defined in IEEE® 802.11u, additional ANQP messages may alternatively or additionally be defined in the Wi-Fi Alliance ("WFA") Hotspot 2.0 specifications, alternatively known as Wi-Fi Certified PassPoint. The WFA Hotspot 2.0 may also be referred to as WFA PassPoint. These ANQP extensions within the WFA Hotspot 2.0 specifications may be referred to as Hotspot ("HS") 2.0 ANQP elements. Alternatively, other advertisement protocols (e.g., Registered Location Query Protocol "RLQP" as defined in IEEE® 802.11af and Hotspot Registration Protocol (HRP) as defined in WFA Hotspot 2.0 specifications) may also be used. In alternative embodiments, other layer-2 transport mechanisms or even authentication mechanisms such as the Extensible Authentication Protocol (EAP) could be used to carry the STP or ANQP messages, as an alternative to GAS. The STP or ANQP message would be encapsulated within a suitable EAP-TLV method frame (or alternative EAP method frame) and transported by the EAP.

FIG. 1 illustrates a communication network 100. Service information may be communicated during network discovery using STP over the communications network 100. The communication network 100 includes a plurality of WLAN access locations 102a-c having respective access points ("APs") 104a-c that provide access to respective access networks 106a-c. The APs 104a-c are further described with respect to FIG. 6. The access network A 106a provides access to an external network A 108a and the access network B 106b provides access to an external network B 108b. Unlike the access networks A 106a and B 106b that do not connect directly to the Internet 112, the access network C 110 may connect directly to a publicly accessible network like the Internet. Thus, the access network C 106c may be a public network, while the access networks A 106a and B 106b may be private networks. Any of the described networks may form part of an ESS.

In one embodiment, each of the external networks A 108a and B 108b may be a subscription service provider network ("SSPN") owned or operated by data subscription service providers, Internet subscription service providers, media (e.g., audio/video) subscription service providers, wireless communications subscription service providers, or any combination thereof. The external networks A 108a and B 108b are connected to the Internet 112 and may, for example, provide subscription-based Internet access to mobile device devices. In some implementations, roaming agreements between different subscription service providers may enable the external networks A 108a and B 108b to support roaming connections for mobile devices associated with other subscription service providers. In one embodiment, the external networks 108a-b are ESS networks. Alternatively, networks 106a-c may be ESS networks.

Figure 3:
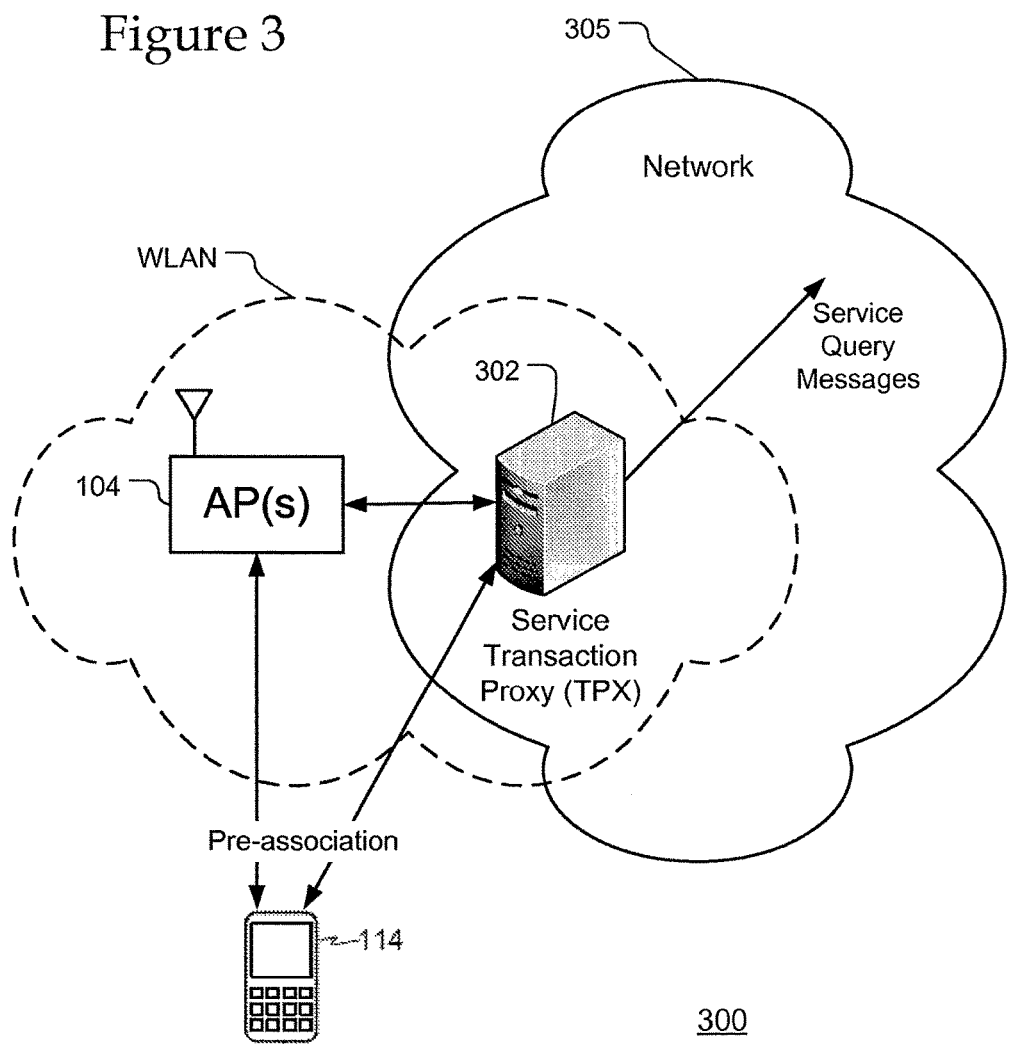
FIG. 3 illustrates an alternative communication network.
Figure 4:
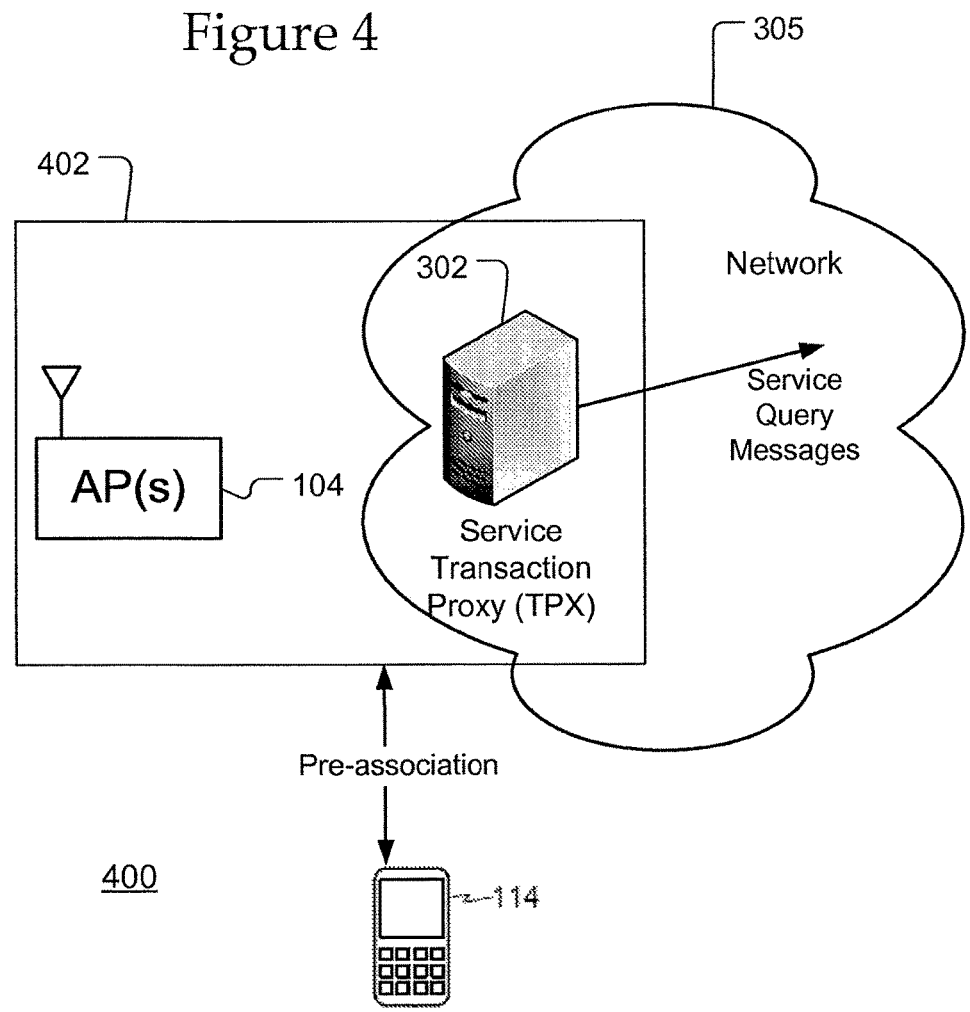
FIG. 4 illustrates another alternative communication network.

The WLAN access location 102a illustrates a mobile device 114 in wireless range of the access point ("AP") 104a. The mobile device 114 is further described with respect to FIG. 5. The AP 104a connects with the access network A 106a, which may provide a direct or indirect connection to other networks, including publicly accessible network like the Internet 112. Prior to the mobile device 114 associating with the access network A 106a, mobile device 114 sends a discovery request 116 to the AP 104a. The AP 104a may respond with a discovery response 118. In alternative embodiments, the discovery request 116 may originate from the AP 104a and the discovery response 118 may be from the mobile device 114, such as with mesh, peer to peer, ad-hoc or Wi-Fi Direct networks. The discovery request 116 or the discovery response 118 may include discovery communications 120. The discovery communications 120, also known as service information, network information, discovery information, or network discovery information, may include information about the network and/or device that is communicated between the device and the network prior to the device associating with the network. Accordingly, the discovery communications 120 may be referred to as pre-association communications or pre-association information. In particular, the discovery communications 120 may include service information about services available to the network. Accordingly, the discovery request 116 may be a service request message or service query message, and the response 118 may be a service request response message. FIGS. 3-4 further illustrate service requests. In one embodiment, the discovery communications 120 or service requests/response may be communicated using STP.

The discovery communications (request 116 and response 120) may be exchanged at a media access control ("MAC") sub-layer of a data link layer of the Open Systems Interconnection ("OSI") Reference Model without needing to use operations at or above an internet protocol ("IP") layer (i.e., a network layer) and without needing to otherwise provide access to the IP layer while discovering discovery communications 120. Discovering service information using messages exchanged at or above the network layer may require more processing power for a mobile device than implementing processes at the MAC sub-layer. The layers in which the discovery communication occurs are further illustrated in FIG. 2.

Each of the APs 104a-c and the mobile device 114 may include a network adapter or network interface card that facilitates connections to a wireless medium. The network interface component may be referred to as a station ("STA"). The mobile device 114 may associate with different APs (e.g., the APs 104a-c) based at least partially on the discovery communications 120 received regarding the available services that are provided through a particular AP from an external network. The mobile device 114 may receive information from the APs when moved in range of one of the WLAN access locations 102a-c, respectively.

Figure 2:
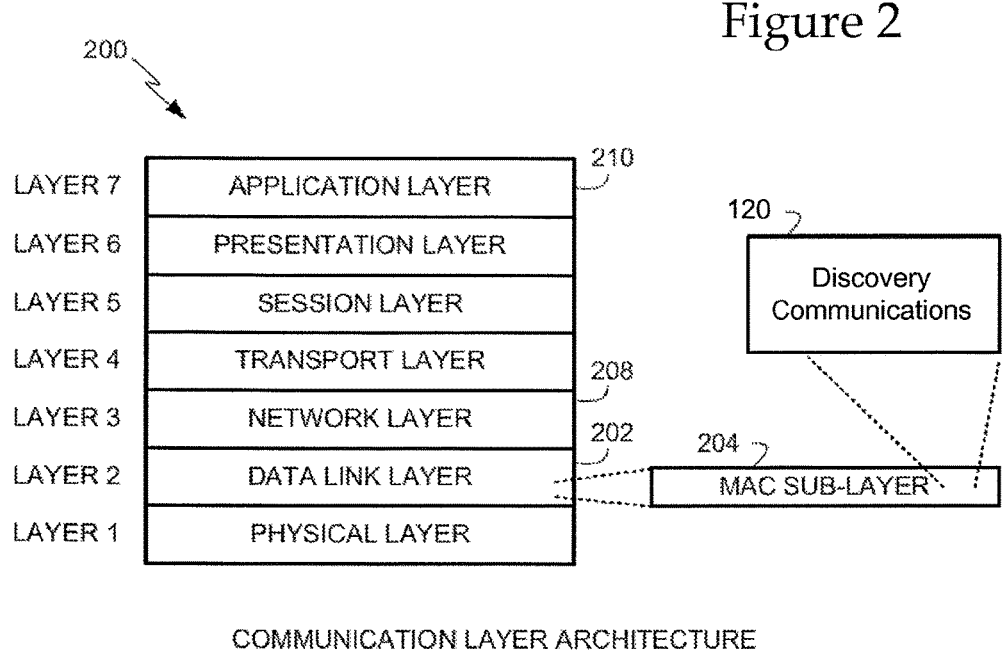
FIG. 2 illustrates a communication layer architecture.

FIG. 2 illustrates a communication layer architecture 200. The communication layer architecture 200 includes seven layers which may be implemented in accordance with the Open Systems Interconnection ("OSI") Reference Model. The communication layer architecture 200 includes a data link layer 202, which includes a media access control ("MAC") sub-layer 204. The MAC sub-layer provides addressing and channel access control mechanisms that make it possible for several devices or network nodes to communicate within a multiple access network that incorporates a shared medium, e.g. Ethernet. The hardware that implements the MAC may be referred to as a medium access controller. The MAC sub-layer acts as an interface between the logical link control ("LLC") sub layer and the network's physical layer. The MAC layer emulates a full-duplex logical communication channel in a multi-point network. This channel may provide unicast, multicast or broadcast communication service.

Mobile devices (e.g., the mobile device 114 of FIG. 1) may provide service requests or discovery communications 120 (e.g. the discovery request 116 and the discovery response 118) with wireless APs (e.g., the APs 102a-c of FIG. 1) at the MAC sub-layer 204. A mobile device may access information from a memory or other hardware of the mobile device at the MAC sub-layer 204 without needing to perform operations at or above an internet protocol layer (e.g., a network layer 208) and without needing to provide access to the internet protocol layer. Mobile devices (e.g., the mobile device 114 of FIG. 1) that include mobile smart phones, PDA's, processor based devices, etc. may have relatively limited processor cycles and less available electrical power than fixed-location computing devices powered using wired (e.g. alternating current) electricity sources. Low-level resource operations at the MAC sub-layer require relatively fewer system resources than user-interface-intensive and operating system intensive operations (e.g., webbrowser operations) at an application layer.

Some communications or authentication techniques that use hypertext transfer protocol ("HTTP") or other internet protocol processes may require establishing a connection between a mobile device and a wireless access point at one or more of the layers between and including the network layer 208 and an application layer 210 of the communication layer architecture 200. In these applications, discovery communications 120 may not require a connection or access to the network layer 208 or any layers within a protocol suite. An inclusion of a discovery communication 120 on the MAC sub-layer 204 may allow for a mobile device to communicate with a network without associating with the network. Discovering service information available via access points using the MAC sub-layer may be used for identifying services that are provided.

FIG. 3 illustrates an alternative communication network 300. In particular, the network 300 illustrates the communication between a mobile device 114, one or more AP(s) 104, and a service transaction proxy ("TPX") server 302. A WLAN is provided by one or more of the AP(s) 104. The mobile device 114 communicates with pre-association messages with the WLAN from the AP(s) 104. The TPX server 302 accesses an external network 305 for identifying available services. The TPX server 302 may be an advertisement server that communicates discovery or pre-association messages. In one embodiment, the TPX server 302 is an enhanced advertisement server that transmits service request messages utilizing STP. In another embodiment, the TPX server 302 communicates with ANQP discovery messages. The TPX server 302 may be located within the LAN and is connected to the network 305, which may not be normally accessible by the mobile device 114 in a pre-association state. In other words, the TPX server 302 allows the mobile device 114 to determine service information and/or available services within the network 305 before associating with the WLAN through the use of pre-association messages. In one embodiment, the determination of service information may be from free string queries.

The TPX server 302 may transmit service query messages to identify services available through the WLAN or the network 305. A service query message may be a communication using a pre-existing protocol on a network, such as Transmission Control Protocol ("TCP"). The TPX server 302 sends the service query messages to the network. The network may include a one or more public or private networks and may be the Internet in one embodiment. STP Request is a request for service information about a particular service from a third-party over the network. In one embodiment the STP Request may include a keyword or query and an STP Response is an answer to the query.

Upon receiving a service request message, the TPX server 302 may respond by parsing the query string within the request to determine if it has an identification (and associated information) of such a service. If not, the TPX server 302 will search for services within the WLAN or in the external network 305. If no service is found within the WLAN or in the external network 305 that "matches" (i.e., is responsive to or is associated with) the requested service, then the mobile device is notified. The messaging and codes used for STP communications are described below with respect to FIGS. 7-8.

The TPX server 302 may cache service information determined from previous requests so that responses to service query requests may be answered with service information stored in cache. This information may be reviewed after a timeout period and all stored information should have a lifetime associated with it (e.g. a period of validity). Existing network upper layer (e.g. layer 7 in FIG. 2) protocols such as Lightweight Directory Access Protocol ("LDAP"), Bonjour™ or Universal Plug and Play™ ("UPnP") may be used to carry the service query messages between the TPX server 302 and the network. These protocols may be transported across the network using User Datagram Protocol ("UDP") or Internet Protocol ("IP"). Alternatively a specific subset of one of these protocols may be used.

In one example, an application in the mobile device may require a 3D printer (i.e., a service as described above). Accordingly, the application operating within the mobile device sends a request to the STP in the mobile device. The request is forwarded over the WLAN to the TPX server 302. The request is then analyzed and processed by the TPX server 302. A suitable response may be already cached, or the TPX server 302 searches for the service requested by the request in the larger network 305. Once a response to the request is determined, the TPX server 302 transmits the response back to the mobile device 114 using an STP frame over the WLAN and air interface. The response is then sent, from the STP in the mobile device 114, to the original application in the mobile device that sent the request for locating a 3D printer in the present example.

The TPX server 302 may proactively search for services in the WLAN or in the external network 305. The TPX server 302 may also search for services based on receiving a request from the mobile device 114. The identification of services may occur when the TPX server 302 is switched "ON" through initial communications with the WLAN or in response to a STP element (e.g. Request message). The identification and information about services may be stored (e.g. cached) locally within the TPX server 302.

In alternative embodiments, multiple TPX servers may be utilized within one or more WLANs. The TPX servers may be connected together. Information between the TPX servers may be shared and cached. Accordingly, service information form one TPX server may be utilized for answering requests from a different TPX server. In one embodiment, the IEEE 802.11 extended capability frame may updated to allow an access point to advertise the STP capability.

FIG. 4 illustrates another alternative communication network 400. In particular, FIG. 4 shows that the AP(s) 104 and the TPX server 302 may be combined as a single unit 402. In other words, the TPX server 302 may be part of one of the AP(s) 104. The mobile device 114 submits pre-association communications to the single unit 402 and the TPX server 302 transmits service query messages to the external network 305 as shown. FIG. 4 does not illustrate the WLAN from the AP(s) 104.

FIG. 5 illustrates a mobile device 114 as shown in FIGS. 1, 3, and 4. The mobile device 114 includes a processor 502 that may be used to control the overall operation of the mobile device 114. The processor 502 may be implemented using a controller, a general purpose processor, a digital signal processor, dedicated hardware, or any combination thereof. The processor 502 may include a central processing unit, a graphics processing unit, a digital signal processor or other type of processing device. The processor 502 may be a component in any one of a variety of systems. For example, the processor 502 may be part of a standard personal computer or a workstation. The processor 502 may be one or more general processors, digital signal processors, application specific integrated circuits, field programmable gate arrays, servers, networks, digital circuits, analog circuits, combinations thereof, or other now known or later developed devices for analyzing and processing data. The processor 502 may operate in conjunction with a software program, such as code generated manually (i.e., programmed).

The mobile device 114 also includes a terminal message generator 504 and a terminal data parser 506. The terminal message generator 504 may generate service discovery messages such as the discovery request 116 and discover response 118 for communicating the service information from FIG. 1. The terminal data parser 506 may be used to retrieve network information from memory (e.g., random access memory 510, etc.). For example, the terminal data parser 506 may request service information from a WLAN (e.g., the access networks 106a-c of FIG. 1) to identify services available to the network.

In the illustrated embodiment, the terminal message generator 504 and the terminal data parser 506 are shown as separate from and connected to the processor 502. In alternative embodiments, the terminal message generator 504 and the terminal data parser 506 may be implemented in the processor 502 and/or in a wireless communication subsystem (e.g., a wireless communication subsystem 518). The terminal message generator 504 and the terminal data parser 506 may be implemented using any combination of hardware, firmware, and/or software. For example, one or more integrated circuits, discrete semiconductor components, and/ or passive electronic components may be used. For example, the terminal message generator 504 and the terminal data parser 506, or parts thereof, may be implemented using one or more circuits, programmable processors, application specific integrated circuits, programmable logic devices, field programmable logic devices, etc.

The terminal message generator 504 and the terminal data parser 506, or parts thereof, may be implemented using instructions, code, and/or other software and/or firmware, etc. stored on a machine accessible medium and executable by, for example, a processor (e.g., the processor 502). The terminal message generator 504 or the terminal data parser 506 may be stored on or include a tangible storage medium or memory. For example, the terminal message generator 504 or the terminal data parser 506 may be implemented in software stored on a memory that is executable by the processor 502. Alternatively, the terminal message generator 504 and/or the terminal data parser 506 may be implemented in hardware with software functions. The memory for storing software associated with the terminal message generator 504 and/or the terminal data parser 506 may include, but is not limited to, computer readable storage media such as various types of volatile and non-volatile storage media, including random access memory, read-only memory, programmable read-only memory, electrically programmable read-only memory, electrically erasable read-only memory, flash memory, magnetic tape or disk, optical media and the like. In one embodiment, the memory may include the random access memory 510 for the processor 502, or may be an external storage device or database for storing recorded ad or user data. Examples include a hard drive, compact disc ("CD"), digital video disc ("DVD"), memory card, memory stick, floppy disc, universal serial bus ("USB") memory device, or any other device operative to store user data. The memory is operable to store instructions executable by the processor 502.

The mobile device 114 may include a FLASH memory 508, a random access memory 510, and/or an expandable memory interface 512 coupled with the processor 502. The FLASH memory 508 may store computer readable instructions and/or data. In some embodiments, the FLASH memory 508 and/or the RAM 510 may store the discovery communications 120 (service information) from FIG. 1 and instructions for communicating that information. The processor 502 may be coupled with the memory (e.g. the FLASH memory 508, or the RAM 510) for storing software instructions executable by the processor 502. The memory may include, but is not limited to, computer readable storage media such as various types of volatile and non-volatile storage media, including random access memory, read-only memory, programmable read-only memory, electrically programmable read-only memory, electrically erasable read-only memory, flash memory, magnetic tape or disk, optical media and the like. The functions, acts or tasks illustrated in the figures or described herein may be performed by the programmed processor 502 executing the instructions stored in the memory. The functions, acts or tasks are independent of the particular type of instruction set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The mobile device 114 may include a security hardware interface 514 to receive a SIM card from a wireless service provider. A SIM card may be used for service discovery communications including authentication of the mobile device 114 for establishing a connection with a WLAN-supported network. The mobile device 114 may be provided with an external data I/O interface 516. The external data I/O interface 516 may be used by a user to transfer information to the mobile device 114 through a wired medium.

The mobile device 114 may include wireless communication subsystem 518 to enable wireless communications with access points (e.g., the APs 104*a-c* of FIG. 1). Although not shown, the mobile device 114 may also have a long-range communication subsystem to receive messages from, and send messages to, a cellular wireless network. In the illustrated examples described herein, the wireless communication subsystem 518 can be configured in accordance with the IEEE® 802.11 standard. In other example implementations, the wireless communication subsystem 518 may be implemented using a BLUETOOTH® radio, a ZIGBEE® device, a wireless USB device, an ultra-wideband radio, a Near Field Communications ("NFC") device, or a Radio Frequency Identifier ("RFID") device.

The mobile device 114 may include a user interface for communicating with the mobile device. The user interface may be separate component or it may include a speaker 520, a microphone 522, a display 524, and a user input interface 526. The display 524 may be a liquid crystal display, an organic light emitting diode, a flat panel display, a solid state display, a cathode ray tube, a projector, a printer or other now known or later developed display device for outputting determined information. The user input interface 526 may include alphanumeric keyboard and/or telephone-type keypad, a multi-direction actuator or roller wheel with dynamic button pressing capability, a touch panel, etc. The service discovery information that is communicated with a network prior to connection may be communicated with or without each of the user interfaces described herein. The speaker, 520, the microphone 522, the display 524, the user input interface 526, and/or any combination thereof may be omitted in alternative embodiments. In one embodiment, the mobile device 114 is a battery-powered device and includes a battery 528 and a battery interface 530.

Figure 6:
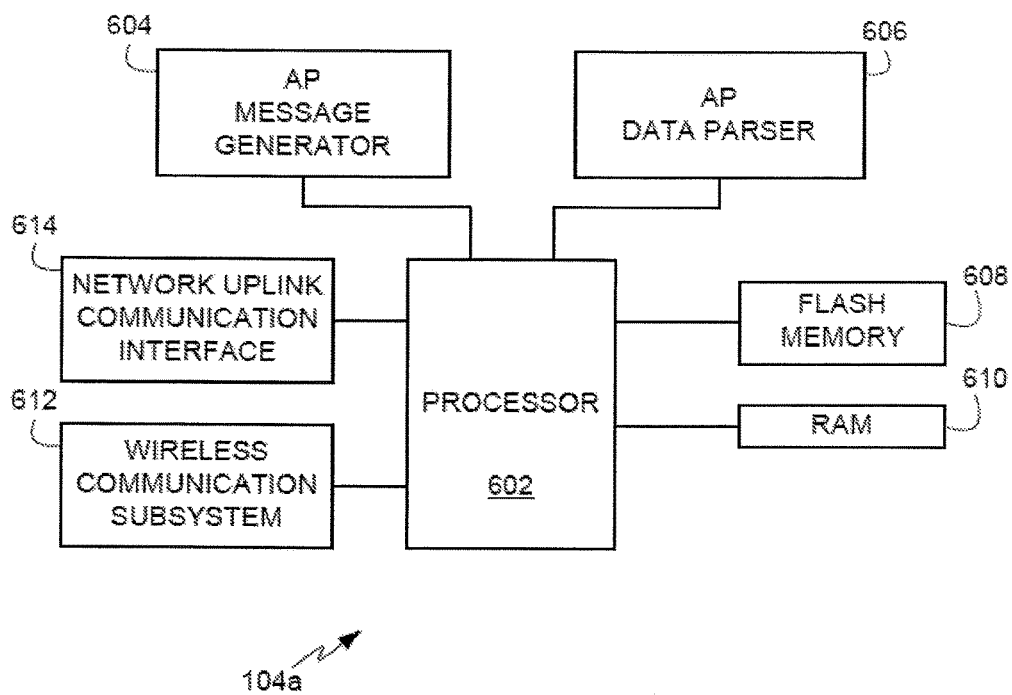
FIG. 6 illustrates an access point ("AP")

FIG. 6 illustrates an access point ("AP") 104*a*. The access point shown in FIG. 6 is AP 104*a*, but may also be illustrative of other access points (e.g. APs 104*b*, 104*c*). AP 104*a* includes a processor 602 to perform operations of the AP 104*a*. The processor 602 may be similar to the processor 502 described above.

The AP 104*a* includes an access point message generator 604 to generate service information communications and an access point data parser 606 for retrieving service information communications from the mobile device 114 and/or the external network A 108*a* as illustrated in FIG. 1. The access point message generator 604 may be similar to the terminal message generator 504 of FIG. 5, and the access point data parser 606 may be similar to the terminal data parser 506 of FIG. 5. As with the terminal message generator 504 and the terminal data parser 506 of FIG. 5, the access point message generator 604 and the access point data parser 606 may be implemented in software stored on a memory that is executable by the processor 602 or may be implemented in hardware with software functions executed by the processor 602. Alternatively, the access point message generator 604 and the access point data parser 606 may be implemented in a wireless communication subsystem (e.g., a wireless communication subsystem 612) using any combination of hardware, firmware, and/or software including instructions stored on a tangible computer readable medium and/or a non-transitory computer readable medium.

The AP 104*a* may also include a FLASH memory 608 and a RAM 610, both of which are coupled to the processor 602. The FLASH memory 608 and/or the random access memory ("RAM") 610 may be configured to store network information (e.g., discovery communications 120, including service information from FIG. 1). The RAM 610 may also be used to generate messages for communication with the mobile device 114 and/or to the external network A 108*a*. The RAM 610 may also store received messages communicated by the mobile device 114 and/or the external network A 108*a*.

To communicate with mobile devices such as the mobile device 114, the AP 104*a* may include a wireless communication subsystem 612, which may be similar to the wireless communication subsystem 518 of the mobile device 114 illustrated in FIG. 5. To communicate with a WLAN-supported network or external network (e.g., the networks 106*a-c*, 108*a*, and 108*b* of FIG. 1), the AP 104*a* may include a network uplink communication interface 614.

Service Transaction Protocol ("STP") was described above and may allow service discovery to occur between a mobile device and an advertisement server (e.g. TPX server 302 in FIG. 3), so that network service capabilities (e.g. for a specific application) can be determined, before the mobile device is assigned an IP address. STP may allow service discovery to occur between a mobile device and an access point (and hotspot), so that network service capabilities (e.g.

for a specific application) can be determined, before the mobile device is assigned an IP address. For example, if an application on the mobile device requires a 3D Printer service, this protocol will enable the discovery of that service prior to the mobile device associating with the network.

STP may be transaction oriented so that when a mobile device or access point receives a message from an upper layer (see FIG. 2), the message is transported within the protocol to the other device. The protocol is bi-directional and can be initiated and terminated by either the mobile device or the access point. Transaction tokens may be used to allow the protocol to manage the transmission of messages from the mobile device to the TPX. Therefore upper layer protocols, for example SLP and UPnP may be carried within MAC frames over the IEEE 802.11 air interface prior to the mobile device associating with a network. An indication of which upper layer protocol is being carried may also be provided.

Figure 7:
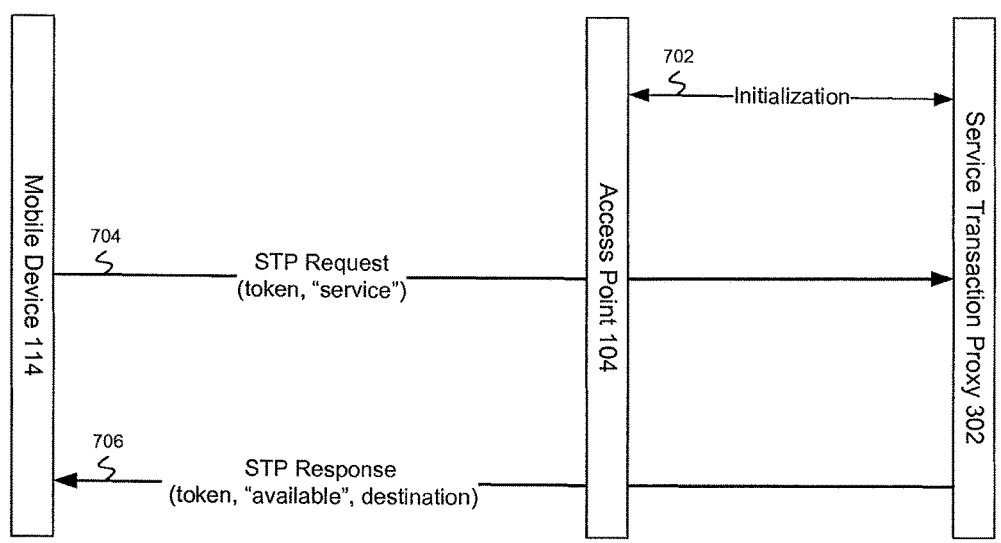
FIG. 7 illustrates an embodiment of service transaction protocol messaging.

FIG. 7 illustrates an embodiment of STP messaging. A security relationship may be established between the AP 104 and the TPX server 302 through an initialization message 702. In alternative embodiments (e.g. FIG. 4), the TPX server 302 may be combined with the AP which may eliminate the need for an initialization message. STP communications may further include an STP Request 704 from a mobile device 114 to the STP advertisement server (e.g. the TPX server 302) and an STP Response 706 from the STP advertisement server to the mobile device 114 that includes the service information requested. The service request may be from an application within the mobile device that requests a service (e.g. 3D Printer) in the LAN. An STP Request message carries this information to the STP Advertisement Server (e.g. the TPX server 302). A suitable network protocol may be used to transport the search message. Once a response is determined the STP Advertisement Server transmits an STP Response back to the mobile device, including information related to the original search message. The contents of the STP Response, once received by the mobile terminal, is passed back to the application.

The STP Request 704 may be from an application within the mobile device requesting a service (e.g. 3D Printer) in the WLAN. An enhanced STP Request message 704 carries this information to the TPX server 302. A token may be attached to the request so that the STP Response 706 can be paired up with the STP Request 704. The TPX server 302 processes and analyses the message. A suitable response may be already cached, or the TPX server 302 searches for the service required in the WLAN or external network 305. A query message (comprising a request and a response) may be provided as part of STP that allows for matching patterns and keywords to be included by the mobile device 114 within an STP Request, and for subsequent STP Responses to be received that contain information about available services within the network.

GAS may provide a dialog token that is carried over the IEEE 802.11 air interface, but it effectively terminates in the AP, so an STP token may be required to uniquely identify the STP message as it is transmitted over the network between the AP and the TPX server 302.

The TPX server 302 transmits an enhanced STP Response 706 (or an STP return code) back to the mobile device 114, including: the STP token, some indication of success (or failure) and information directly related to the original search message (e.g. service availability). As an example this may be the destination address of a 3D printer as an address. The contents of the enhanced STP Response 706, once received by the mobile terminal 114 may be passed back to the application.

Figure 8:
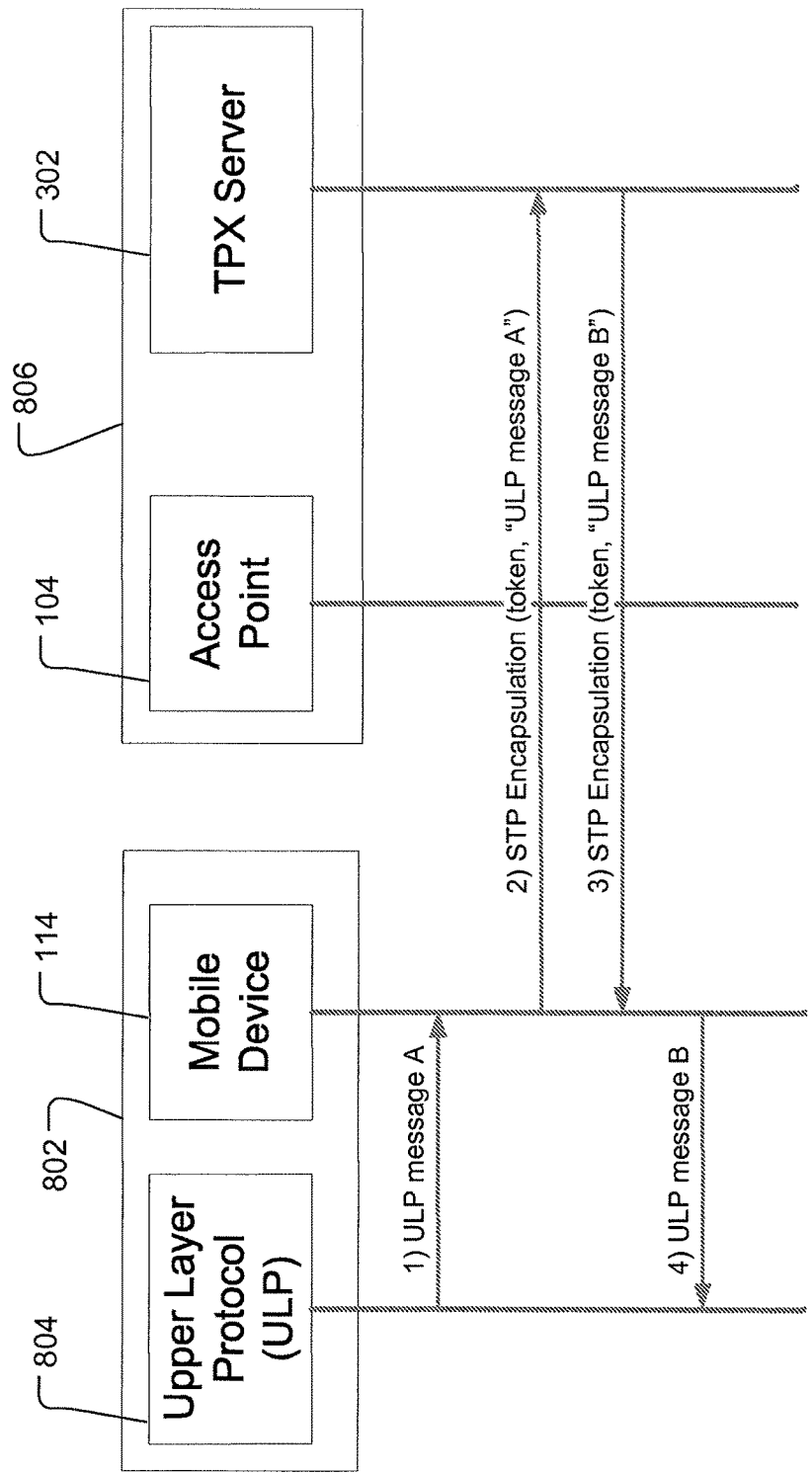
FIG. 8 illustrates another embodiment of service transaction protocol messaging.

FIG. 8 illustrates another embodiment of service transaction protocol messaging utilizing upper layer protocols ("ULP"). The STP may encapsulate upper layer service discovery messages, for example Bonjour or UPnP. Typically a subset of theses ULPs (e.g. Bonjour identifiers) may be used, as no IP connectivity would exist between the mobile device and the access point in the discovery or pre-association stage. FIG. 8 shows a message sequence supporting an ULP (typically within an application) on the mobile device 114, which may wish to communicate with a corresponding ULP 804 in the TPX server 302. The ULP 804 may be software that is installed on the mobile device and access point. In one embodiment, the TPX server 302 may be co-located on the AP 104 and performs a minimal role in just forwarding ULP frames to an application on the same AP 104.

A service discovery ULP 804 (e.g. UPnP) within the mobile device 114 wishes to send a message A to the LAN or external network (e.g. to discover a service). An STP Encapsulation message carries the ULP message A to the TPX server 302. The TPX server 302 may be combined 806 with the AP 104. The TPX server 302 may also include a co-located service discovery ULP (not shown) that receives the encapsulation message. As the STP element type is STP encapsulation the TPX server 302 recognizes that no analysis is required. It merely forwards the message to the higher layer. When the higher layer ULP responds with another message B, the TPX server 302 uses another STP encapsulation message to transmit message B back to the mobile device 114 including the STP token. If an error occurs in the TPX server 302 transaction, a return code may be alternatively returned to the mobile. When the STP encapsulation message is received by the mobile device, the contents are passed back to the service discovery ULP.

This message sequence in FIG. 8 may be bi-directional and can be initiated by the ULP 804 co-located with the TPX server 302 in unit 802. Additionally STP may not need to "answer" Message A with a Message B, as it may have no knowledge of how the ULP operates. STP forwards each ULP message over the IEEE 802.11 air interface as individual transactions and may be transparent to the ULP operation.

The messaging for STP may include the following exemplary messages with unique identifications ("ID"). The following messages may also be referred to as STP Message definitions:

TABLE 1

STP Message Definitions

| STP message | ID |
| --- | --- |
| Reserved | 0 |
| Encapsulation | 1 |
| Request | 2 |
| Response | 3 |
| Return Code | 4 |
| Certificate | 5 |
| Location | 6 |
| Reserved | 7-220 |
| Vendor Specific | 221 |
| Reserved | 222-255 |

The "Reserved" and "Vendor Specific" values may be utilized to preserve backward compatibility with IEEE 802.11 element definitions. The STP messages are further described below. In each of these frame formats, the length of each field is merely exemplary.

Encapsulation Message:

The encapsulation message may be used to carry upper layer service discovery messages. The message may be used in ULP Discovery or ULP Encapsulation. In ULP Discovery, the encapsulation message is sent from a mobile device to the TPX server 302 to determine which ULPs are available within the local access network or network. The TPX server 302 may respond with none, a specific one, or even a list of options. It may then be up to the mobile device to determine how to proceed. Other encapsulation messages can be subsequently used for negotiation between the mobile device 114 and the TPX server 302 as to which specific ULP will be used. Alternatively the mobile device and the TPX server 302 may decide to use different ULPs. For example, the mobile device to TPX server 302 segment may be Bonjour and then the TPX server 302 translates the Bonjour into UPnP for the network to which it is attached.

In ULP Encapsulation, the encapsulation message may be sent from the mobile device 114 or a TPX server 302, encapsulating a ULP. STP may be transparent to the actual operation of the ULP. The format for the encapsulation message may be:

|  | ID | STP Token | Length | ULP ID | ULP payload | Signature Length (optional) | Signature (optional) |
|---|---|---|---|---|---|---|---|
| Octets: | 2 | 2 | 2 | 1 | variable | 2 | variable |

The ID field may be set to 1 as per the STP message definitions. The STP Token field may be used for matching STP messages when there are multiple, concurrent messages, between the mobile device and the TPX server. As described, the mobile device 114 and the TPX server 302 may be exemplary STP ending points for STP communications. The Length field may be set to the number of octets in the ULP payload field and Signature fields (if present)+1. The ULP ID field may be an identity of the ULP as shown in the following table.

TABLE 2

Upper Layer Protocol Identifiers

| ULP name | ULP Abbreviation | ULP ID |
|---|---|---|
| List of available ULPs | — | 0 |
| DNS Service Discovery, part of Apple's Bonjour technology | DNS-SD, Bonjour | 1 |
| Service Location Protocol | SLP | 2 |
| Simple Service Discovery Protocol as used in Universal Plug and Play | SSDP, UPnP | 3 |
| Universal Description Discovery and Integration for web services | UDDI | 4 |
| Jini for Java objects. | JINI | 5 |
| Bluetooth Service Discovery Protocol | SDP | 6 |
| Salutation | Salutation | 7 |
| XMPP Service Discovery | XEP-0030 | 8 |
| Web Services Dynamic Discovery | WS-Discovery | 9 |

TABLE 2-continued

Upper Layer Protocol Identifiers

| ULP name | ULP Abbreviation | ULP ID |
|---|---|---|
| multicast DHCP | MDHCP | 10 |
| Internet Storage Name Service | iSNS | 11 |
| Web Proxy Autodiscovery Protocol | WPAD | 12 |
| Dynamic Host Configuration Protocol | DHCP | 13 |
| eXtensible Resource Descriptor Sequence | XRDS | 14 |
| e911 (Emergency Service) | e911 | 15 |
| Next Generation 911 (Emergency Service) | NG911 | 16 |
| Location Service | Location | 17 |
| ANQP element | ANQP | 18 |
| RLQP element | RLQP | 19 |
| Reserved | — | 20-255 |

The commonly used service discovery protocols discussed above may also include emergency service capabilities. Location can be any location information, carried by the Encapsulation message and is further discussed below. ANQP element is designed to carry an ANQP-element as defined by IEEE 802.11u or WFA Hotspot 2.0. Likewise, the RLQP element is designed to carry an RLQP element as defined by IEEE 802.11af or the WFA TV White Spaces Group. If set to 0, the ULP payload field then contains a comma separated list of all supported ULPs (e.g. "3, 12, 14").

The ULP payload field may carry the ULP. The Signature Length field may be set to the number of octets in the Signature field. It may only be required if the signature field is present. The Signature field allows a signature to be generated by the transmitting device (typically the AP using for example an elliptic curve algorithm) using the contents of the frame together with a secure identity. The signature provides authenticity of the contents of the Encapsulation message. The receiving device then uses the certificate to verify the Signature.

Query Request Message

The Query messages may used to carry a query exchange between the mobile device and the TPX server. An exemplary STP Request message format may be:

|  | ID | STP Token | Length | Query Request | Signature Length (optional) | Signature (optional) |
|---|---|---|---|---|---|---|
| Octets: | 2 | 2 | 2 | variable | 2 | variable |

The ID field may be set to 2 as per the STP message definitions in Table 1. The STP Token field may be used for matching STP responses with requests when there are multiple, concurrent requests, between the mobile device and the STP terminating point. The Length field may be set to the number of octets in the Query Request field and Signature fields (if present). The Query Request field may carry a free text query string (for example, "printer" or a specific identifier for identifying a service). An empty string will result in all services being provided by the TPX server. A protocol such as UNIX POSIX is used for the matching patterns (e.g. "3DPrinter*" where the "*" indicates a match to any trailing string pattern). The Signature fields are the same as those defined above for the Encapsulation message.

Query Response Message

The Query messages (Requests/Responses) may be used to carry a query exchange between the mobile device and the TPX server. An exemplary STP Response message format may be:

|  | ID | STP Token | Length | Fragment | Fragment Number (optional) | Query Response | Signature Length (optional) | Signature (optional) |
|---|---|---|---|---|---|---|---|---|
| Octets: | 2 | 2 | 2 | 1 | 1 | variable | 2 | variable |

The ID field may be set to 3 as per the STP message definitions in Table 1. The STP Token field may be used for matching STP responses with requests when there are multiple, concurrent requests, between the mobile device and the STP terminating point. The Length field may be set to the number of octets in the Query Response field and Signature fields (if present) and the Fragment Number field (if the Fragment field is not set to 0). The Fragment field is set to 1 if the response is fragmented over several STP messages and there are more fragmented STP Responses to follow. Un-fragmented STP responses (or the last fragment) have this field set to 0. The Fragment number indicates the number of the specific fragment, to allow for re-ordering or error checking if a fragment is not transmitted correctly. The Query Response carries response information (for example, a list of IP addresses, URIs or URLs of any known printers). The Signature fields are the same as those defined above for the Encapsulation message.

Return Code Message

The Return Code message may be used to carry a return code between the TPX server and the mobile device. It can also be used by the mobile device to transmit a return code to the TPX server when an Encapsulation message is received from the TPX server. The Return Code message format may be:

|  | ID | STP Token | Return Code |
|---|---|---|---|
| Octets: | 2 | 2 | 1 |

The ID field may be set to 4 as per the STP message definitions in Table 1. The STP Token field may be used for matching STP responses with requests when there are multiple, concurrent requests, between the mobile device and the STP terminating point. The Return Code field is set to a value defined in

| Message | Return Code |
|---|---|
| Reserved | 0 |
| Empty List | 1 |
| No TXP available | 2 |
| No Service available | 3 |
| Unknown message | 4 |
| Message too large | 5 |
| Unknown failure | 6 |
| Reserved | 7-255 |

Certificate/Signatures

Signature schemes may be used in electronic communications to provide data integrity, origin authentication, and/or non-repudiation. Data may be modified during transit and a signature on the transmitted data could be used to ensure that the receiver can identify if some modification has been made to the signed data. Signatures may be used to provide assurance to the receiver about the source of origin of a given message. Signatures may be used to ensure that an entity that signs the message cannot at a later stage deny having signed the message. A common root of trust may be necessary for signatures to provide the above mentioned services. The trust may be established using a digital certificate comprising at least a public key of the entity that signs the messages. The certificates are usually issued by a trusted third party.

The requesting mobile device may have a pre-existing security relationship with the TPX server and may use keying information to digitally sign requests and authenticate responses. A pre-existing security relationship is established through provisioning keys to the mobile device and the TPX server infrastructure prior to connecting. As STP messages are encapsulated within IEEE 802.11 management frames, the identity of the devices (e.g. MAC address) may be transmitted with the STP messages. In one example, the mobile device and the TPX server store public key/private key pairs from the same root certificate. In this embodiment, the private key is stored in only one location. In another example, the mobile device may have registered with the TPX server and obtained keying material that could be used for signing requests and validating responses. This process may provide data integrity for subsequent STP messages from the TPX server, but not provide integrity for the information within those frames. In other words, the TPX server cannot prove that advertised services are authentic. This would typically be proven by a mobile device, once a network is selected and associated.

The Certificate message may be used to carry a TPX server certificate that may be used by the mobile device to verify subsequent signed STP messages. The TPX server can have a certified public key (in the certificate) from the certificate authority ("CA") and advertise this on the air and then use the corresponding private key to sign the advertised services on the air. If the mobile device wishes to use signed STP elements, then it may send this element with the Length set to 0. The TPX server then knows that the mobile device wishes to use signed element responses. Since STP is bi-directional, it may also be possible for a mobile device to transmit a certificate, in which case the TPX server would transmit a message with the length set to 0. The format for the Certificate message may be:

|  | ID | STP Token | Length | Certificate | Validity Length | Certificate Validity |
|---|---|---|---|---|---|---|
| Octets: | 2 | 2 | 2 | Variable | 1 | variable |

The ID field is set to 5 as per the STP message definitions in Table 1. The STP Token field is used for matching STP responses with requests when there are multiple, concurrent requests, between the mobile device and the TPX server. The mobile device will only accept a response when the STP Token matches that of one of its requests. The Length field may be set to the number of octets of the Certificate field plus the validity fields. It may also be set to 0 to indicate to the TPX server, that the mobile device wishes to use signed messages (or vice versa). If the Length field is not equal to 0 then: 1) the Certificate field is a certificate from the TPX server and it is assumed that it includes the TPX server's public key (or alternatively the certificate from the mobile device, if the TPX server is requesting); 2) the Validity Length field is set to the number of octets of the Certificate Validity field; and 3) the Certificate Validity field includes the validity start and end date of the certificate. It may also contain other information about how a new certificate can be requested (e.g. a URL for online hotspot sign up).

Location

The Location message may be used to carry location information (e.g. as a location service) and is sent from a mobile device or a TXP. The Location message format may be:

|  | ID | STP Token | Length | Location Information |
|---|---|---|---|---|
| Octets: | 2 | 2 | 2 | variable |

The ID field may be set to 6 as per Table 1. The STP Token field is used for matching STP messages when there are multiple, concurrent messages, between the mobile device and the TXP (i.e. the STP terminating points). The Length field may be set to the number of octets in the Location Information field and the Location Information field contains the location information as a variable length field.

Additional STP Messaging Features

STP support may be advertised by a network. Mobile devices that receive discovery information prior to network association can identify which networks support STP and which networks cannot communicate using STP. In one embodiment, the advertisement of STP compatibility may be through the IEEE 802.11 extended capabilities element. The extended capabilities element may be modified to allow IEEE 802.11 devices (e.g. a mobile device and an AP) to advertise (within a beacon) the support of STP. The extended capabilities element may include a MIB variable of type Boolean that is introduced to support this capability bit. When the variable is true, the STP Capability field is set to 1 to indicate the mobile device supports STP. When the variable is false, the STP Capability field is set to 0 to indicate the mobile device does not support STP.

It may be useful to also provide a new ANQP-element to discover whether a network supports STP. A mobile device may use ANQP to discover STP support, and then once found switch to using STP between itself and the TPX server.

To improve the operation of GAS, GAS responses may be broadcast from an AP, so that all mobile devices, within range, can benefit from the information. This may not work if the mobile device is unable to verify signed messages. It is possible that an AP switches from unicast GAS responses to broadcast GAS responses, depending upon the number of GAS requests received in a given time, or another measurement of a high number of mobile devices within the AP's radio range. Mobile devices may be allowed to operate in promiscuous mode (i.e. they don't need to wait for frames specifically addressed to them), so that all GAS response frames can be parsed. This may not always work if the mobile device is unable to verify signed messages.

In another embodiment, STP may be implemented as an extra Public Action Frame, which is an existing IEEE 802.11 structure. This allows STP to be carried by the action frame mechanism. This may be more efficient since GAS is not used, which reduces the size of the frame headers and removes the GAS state machine. The disadvantage of not using GAS is that large messages (e.g. STP messages transmitted as query responses from the TPX server to the mobile device), which do not fit into air interface transmission frames, cannot be fragmented and will be dropped. The format of a new STP Public Action Frame may be:

|  | Category | Public Action | STP message |
|---|---|---|---|
| Octets: | 1 | 1 | variable |

The Category field may be set to 4 (Public). The Public Action field may be set to 16-20 corresponding to the STP messages types. The STP messages field contains STP messages as defined above.

In another embodiment, STP may be implemented as an extension to the Probe Request/Response formats as defined within IEEE 802.11. This allows STP to be carried by a very low level management frame during an active scan. This may provide a more efficient solution since this is a simple frame that is transmitted by a device with minimal checking and protection. However, there is a possibility of placing a large amount of data within a probe response frame that may not be useful from a system radio resource point of view. If this frame is dropped by the IEEE 802.11 air interface, there is minimal indication reported back to the transmitting device. Therefore it may be difficult for a mobile device to actually determine whether an AP actually supports the STP capability or not. The Probe Request Frame Body may be extended as follows:

| Order | Information | Notes |
|---|---|---|
| 14 | STP Certificate | The STP Certificate element is present if STPCertificateActivated is true |
| 15 | STP Encapsulation | The STP Encapsulation element is present if STPEncapsulationActivated is true |
| 16 | STP Request | The STP Request element is present if STPQueryActivated is true |
| 17 | STP Return Code | The STP Return Code element is present if STPCertificateActivated or STPEncapsulationActivated or STPQueryActivated are true |

The Probe Response Frame Body may be extended as follows:

| Order | Information | Notes |
|---|---|---|
| 56 | STP Response | The STP Response element is present if STPQueryActivated is true |

In another embodiment, cellular emergency service discovery may be enabled through the WLAN. These extensions allow an IEEE 802.11 mobile device (and also an AP) to discover if emergency services (and other services), typically found in cellular networks, are available through the WLAN. This may benefit a dual mode (cellular and WLAN) mobile device, if it is located in an area of poor cellular radio coverage or if its credentials (e.g. SIM card) are invalid preventing a connection to the cellular network. The existing IEEE 802.11 standard allows the mobile device to return a list of available cellular networks known by the AP, using the 3GPP Cellular Network ANQP-element containing a payload list of available Public land mobile networks ("PLMNs"). Extending this payload may allow another entry for Emergency Realm PLMNs. Accordingly, when an IEEE 802.11 mobile device uses the ANQP-element to discover available PLMNs, it will also discover any available Emergency Realm PLMNs. There may be an information element identity for the emergency realm list. The emergency realm list may be used by the IEEE 802.11 access network to indicate the emergency realm that can be used by the WLAN for the purposes of performing IMS emergency calls.

The system and process described may be encoded in a signal bearing medium, a computer readable medium such as a memory, programmed within a device such as one or more integrated circuits, and one or more processors or processed by a controller or a computer. If the methods are performed by software, the software may reside in a memory resident to or interfaced to a storage device, synchronizer, a communication interface, or non-volatile or volatile memory in communication with a transmitter. A circuit or electronic device designed to send data to another location. The memory may include an ordered listing of executable instructions for implementing logical functions. A logical function or any system element described may be implemented through optic circuitry, digital circuitry, through source code, through analog circuitry, through an analog source such as an analog electrical, audio, or video signal or a combination. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The invention claimed is:

1. A method for an access point of a wireless local area network ("WLAN"), the method comprising:
receiving from a wireless communication device, a service information request comprising service information, wherein the service information request is part of an advertisement protocol, and the service information identifies a requested service using a string; and
transmitting, prior to an association between the wireless communication device and the WLAN, a service information response;
wherein the service information response notifies the wireless communication device if a service matching the requested service is not found.

2. The method of claim 1, wherein the service information response is determined by a proxy server.

3. The method of claim 2, wherein the proxy server is coupled to the access point and the access point exchanges information between the WLAN and the wireless communication device.

4. The method of claim 2, wherein the proxy server is separate from the access point and the access point exchanges information between the WLAN and the wireless communication device.

5. The method of claim 1, wherein the service information request and the service information response are Access network Query Protocol (ANQP) elements, and the advertisement protocol is ANQP.

6. The method of claim 1, wherein the service information request includes an ID field of 2-octets in size and a length field of 2-octets in size.

7. The method of claim 1, wherein the service information response includes an ID field of 2-octets in size and a length field of 2-octets in size.

8. A method for a wireless communications device, the method comprising:
- transmitting from a wireless communication device, a service information request comprising service information, wherein the service information request is part of an advertisement protocol, and the service information identifies a requested service using a string; and
- receiving, prior to an association between the wireless communication device and a Wireless Local Area Network ("WLAN"), a service information response;
- wherein the service information response notifies the wireless communication device if a service matching the requested service is not found.

9. The method of claim 8, wherein the service information response is determined by a proxy server.

10. The method of claim 9, wherein the proxy server is coupled to an access point and the access point exchanges information between the WLAN and the wireless communication device.

11. The method of claim 9, wherein the proxy server is separate from an access point and the access point exchanges information between the WLAN and the wireless communication device.

12. The method of claim 8, wherein the service information request and the service information response are Access network Query Protocol (ANQP) elements, and the advertisement protocol is ANQP.

13. The method of claim 8, wherein the service information request includes an ID field of 2-octets in size and a length field of 2-octets in size.

14. The method of claim 8, wherein the service information response includes an ID field of 2-octets in size and a length field of 2-octets in size.

15. An access point of a wireless local area network ("WLAN"), the access point comprising:
- at least one receiver configured to receive from a wireless communication device, a service information request comprising service information, wherein the service information request is part of an advertisement protocol, and the service information identifies a requested service using a string; and
- at least one transmitter configured to transmit, prior to an association between the wireless communication device and the WLAN, a service information response, wherein the service information response notifies the wireless communication device if a service matching the requested service is not found.

16. The access point of claim 15, wherein the service information response is determined by a proxy server.

17. The access point of claim 16, wherein the proxy server is coupled to the access point and the access point exchanges information between the WLAN and the wireless communication device.

18. The access point of claim 16, wherein the proxy server is separate from the access point and the access point exchanges information between the WLAN and the wireless communication device.

19. The access point of claim 15, wherein the service information request and the service information response are Access network Query Protocol (ANQP) elements, and the advertisement protocol is ANQP.

20. The access point of claim 15, wherein the service information request includes an ID field of 2-octets in size and a length field of 2-octets in size.

21. The access point of claim 15, wherein the service information response includes an ID field of 2-octets in size and a length field of 2-octets in size.

22. A wireless communications device, the wireless communications device comprising:
- at least one transmitter configured to transmit from a wireless communication device, a service information request comprising service information, wherein the service information request is part of an advertisement protocol, and the service information identifies a requested service using a string; and
- at least one receiver configured to receive, prior to an association between the wireless communication device and a Wireless Local Area Network ("WLAN"), a service information response;
- wherein the service information response notifies the wireless communication device if a service matching the requested service is not found.

23. The wireless communications device of claim 22, wherein the service information response is determined by a proxy server.

24. The wireless communications device of claim 23, wherein the proxy server is coupled to an access point and the access point exchanges information between the WLAN and the wireless communication device.

25. The wireless communications device of claim 23, wherein the proxy server is separate from an access point and the access point exchanges information between the WLAN and the wireless communication device.

26. The wireless communications device of claim 22, wherein the service information request and the service information response are Access network Query Protocol (ANQP) elements, and the advertisement protocol is ANQP.

27. The wireless communications device of claim 22, wherein the service information request includes an ID field of 2-octets in size and a length field of 2-octets in size.

28. The wireless communications device of claim 22, wherein the service information response includes an ID field of 2-octets in size and a length field of 2-octets in size.

* * * * *